(12) United States Patent
Poosala et al.

(10) Patent No.: US 10,080,111 B2
(45) Date of Patent: Sep. 18, 2018

(54) TECHNIQUES FOR COMMUNICATION USING AUDIO STICKERS

(71) Applicant: Facebook, Inc., Menlo Park, CA (US)

(72) Inventors: Viswanath Poosala, Cupertino, CA (US); Ali Yazdan Panah, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 512 days.

(21) Appl. No.: 14/662,717

(22) Filed: Mar. 19, 2015

(65) Prior Publication Data

US 2016/0277903 A1  Sep. 22, 2016

(51) Int. Cl.
| | |
|---|---|
| *H04W 4/12* | (2009.01) |
| *G06F 3/16* | (2006.01) |
| *G06F 3/0481* | (2013.01) |
| *G06F 3/0484* | (2013.01) |
| *G06F 3/0488* | (2013.01) |

(52) U.S. Cl.
CPC ........... *H04W 4/12* (2013.01); *G06F 3/0488* (2013.01); *G06F 3/04817* (2013.01); *G06F 3/04842* (2013.01); *G06F 3/16* (2013.01)

(58) Field of Classification Search
CPC ...... H04L 51/10; H04L 12/14; G06F 3/04817
See application file for complete search history.

(56) References Cited

U.S. PATENT DOCUMENTS

| | | | | |
|---|---|---|---|---|
| 2012/0077496 | A1* | 3/2012 | Mathias | G06Q 30/06 455/435.1 |
| 2012/0250586 | A1* | 10/2012 | Ahmavaara | H04L 41/0896 370/259 |
| 2015/0334067 | A1* | 11/2015 | Zonka | H04L 67/36 715/752 |

* cited by examiner

*Primary Examiner* — Justin S Lee

(57) ABSTRACT

Techniques for securing the delivery of an audio message on a device are described. A method may include presenting a visual representation associated with an audio file in a user interface view of an application executing on a first mobile device and receiving a control directive to select the visual representation. The method may include retrieving, from a data store, an indicator of the audio file associated with the selected visual representation; constructing, by the application, a first message comprising a first field to hold an electronic message address for a recipient and a second field to hold the indicator of the audio file associated with the selected visual representation; and sending the first message to the electronic message address of the recipient for delivery to a destination second mobile device. Other embodiments are described and claimed.

19 Claims, 20 Drawing Sheets

Audio Messages 400

Audio Sticker Database 600

| Identifier | Representation | Audio File |
|---|---|---|
| 0001 | 🙂 | \audiostickerset1\lol.wav |
| 0002 | ❤ | \audiostickerset23\iloveyou.wav |
| 0003 | 🔊 | \audiostickerset1\happybirthday.wav |
| 0004 | ① | \audiostickers\Beyonce\newalbum\song1.mp3 |
| ... | ... | ... |

*FIG. 6*

TECHNIQUES FOR COMMUNICATION USING AUDIO STICKERS

BACKGROUND

Text-based messaging offers many opportunities for short-cuts in communication. For example, text-based emoticons and abbreviations can convey emotions, reactions, and actions in a few keystrokes. For those who are illiterate or who don't read in the language of their communication devices, these text-based shortcuts may not be useful. Further, many such people live in areas where cellular telephone service is unreliable or unaffordable. It is with respect to these and other considerations that the present improvements are needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for communicating using audio messages. Some embodiments are particularly directed to techniques for communicating using audio stickers in audio messages. In one embodiment, for example, a method may include presenting a visual representation associated with an audio file in a user interface view of an application executing on a first mobile device and receiving a control directive to select the visual representation. The method may further include retrieving, from a data store, an indicator of the audio file associated with the selected visual representation; constructing, by the application, a first message comprising a first field to hold an electronic message address for a recipient and a second field to hold the indicator of the audio file associated with the selected visual representation; and sending the first message to the electronic message address of the recipient for delivery to a destination second mobile device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of an audio stickers database for the system of FIG. 1.

DETAILED DESCRIPTION

Figure 1:
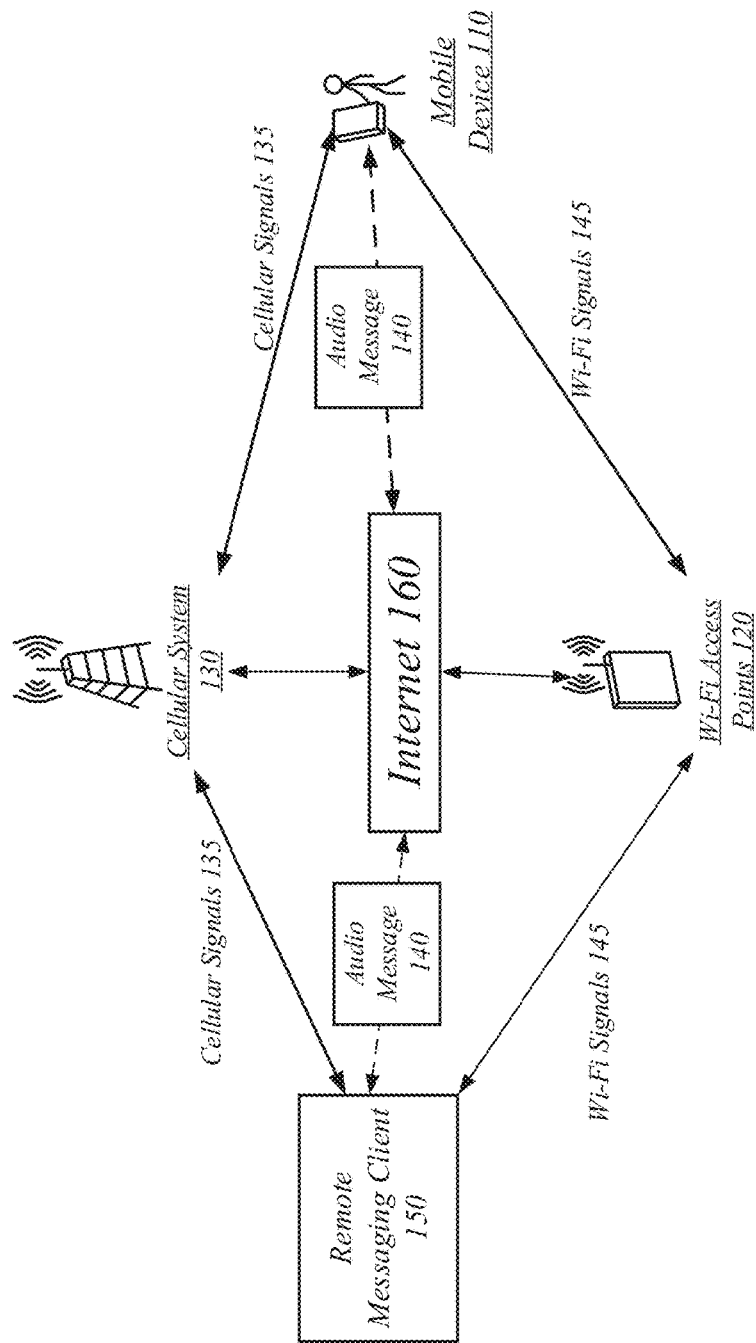
FIG. 1 illustrates an embodiment of an execution system for securing delivery of an audio message.

Various embodiments are generally directed to techniques for communication using audio messages. Some embodiments are particularly directed to techniques for communicating with audio stickers in audio messages. An audio sticker may be visual representation, such as a graphical user interface element (e.g., an object, icon, image, picture, etc.), associated with an audio file. The visual representation may be displayed in a messaging application user interface so that a user of the messaging application may send the audio file by selecting the visual representation. The visual representation may be similar or analogous to an emoticon or an emoji. This allows the user to select and send pre-recorded audio files without necessarily needing to be literate, in a manner similar to communication with conventional text-message abbreviations and acronyms. The visual representations may be visually related to the content of the audio file, for example, an audio file that plays a portion of the "Happy Birthday" song may be associated with a visual representation that shows a birthday cake.

The audio stickers available to all users of a messaging service may be stored on a remote server. The audio stickers may include an identifier that is smaller than the audio file it identifies. Audio messages that include an audio sticker may use the identifier instead of the audio file to reduce the size of the message. The recipient may then download the audio file portion of the audio sticker from the remote server when the audio message containing the identifier is received. Once downloaded, an audio sticker may remain in storage on the local mobile device, enabling reuse without having to reconnect to the remote server.

Multiple audio stickers may be combined into sets of audio stickers. When one is used or downloaded, the recipient may automatically receive the rest of the audio stickers in the set. Sets of audio stickers may be used, for example, by a musician to promote a new musical recording, where each audio sticker includes an excerpt of a music recording. Other sets may be related thematically, or by creator.

In areas where connections to cellular systems are unreliable, unavailable, and/or unaffordable, the messaging application may transmit and receive audio messages containing audio stickers via peer-to-peer networks or hybrid peer-to-peer networks. The embodiments are not limited to these examples.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an audio messaging system 100 for communicating using audio stickers. In one embodiment, the system 100 may comprise a computer-implemented system 100 having a mobile device 110 operated by a sender and a remote messaging client 150 executing on a mobile device operated by a recipient, each comprising one or more components. Although the system 100 shown in FIG. 1 has a limited number of elements in a certain topology, it may be appreciated that the system 100 may include more or fewer elements in alternate topologies as desired for a given implementation. As shown in FIG. 1, the sender and the recipient may be carrying out a messaging conversation with the exchange of audio messages 140.

A mobile device 110 may be any mobile electronic device capable of, at least, recording audio data from a microphone, outputting audio data to the sender, and communicating with other devices to exchange data and instructions over a network. The mobile device 110 may communicate with other devices using wireless transmissions to exchange network traffic. Exchanging network traffic, such as may be included in the exchange of an audio message 140, may comprise transmitting and receiving network traffic via a network interface controller (NIC). A NIC comprises a hardware component connecting a computer device, such as mobile device 110, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

The mobile device 110 may perform various operation using network data accessed over a network. The mobile device 110 may access a cellular system 130 using cellular signals 135. The cellular system 130 may be a cellular network including data access, the cellular system 130 provided by a cellular provider with which the user of the mobile device 110 has a service contract, the service contract for cellular data server to the mobile device 110. The mobile device 110 may use the cellular system 130 to access the public Internet 160 for interacting with one or more other devices.

The mobile device 110 may access one or more Wi-Fi access points 120 using Wi-Fi signals 145. Wi-Fi access points 120 may be provided by a plurality of different operators. Some of the Wi-Fi access points 120 may be personal in nature, such as a home Wi-Fi network operated by the user of mobile device 110 based on a domestic Internet connection. Some of the Wi-Fi access points 120 may be free of charge or provided as a complimentary portion of a service, such as free Wi-Fi service in coffee shops, hotels, and other public accommodations. The mobile device 110 may use Wi-Fi access points 120 to access the public Internet 160 for interacting with one or more other devices. The dashed line between the Internet 160 and mobile device 110 indicates that an audio message 140 may be exchanged with other devices ultimately using the Internet 160, with one of the cellular system 130 and Wi-Fi access point 120 acting as the medium to access the Internet 160.

In some embodiments, an audio message 140 may exchanged with other devices entirely over a peer-to-peer communication path, for example, using only one or more Wi-Fi access points 120, and/or other local peer-to-peer connections, and without using the cellular system 130. In other embodiments, an audio message 140 may exchanged with other devices using a hybrid a peer-to-peer communication path that includes a connection to the cellular system 130 at one or more points in the communication path. These peer-to-peer and hybrid peer-to-peer communication paths may be useful in particular in areas with limited or lacking cellular service, or where cellular service is not affordable to portions of the population.

The system 100 may also include a remote messaging client 150. The remote messaging client 150 may be software and/or a combination of software and hardware operating on any electronic device capable of sending and receiving an audio message 140 to and from the mobile device 110. The remote messaging client 150 may operate on a mobile device such as a smartphone or tablet computer, or may be a laptop computer, a desktop computer, or a telephone system with messaging capability.

The remote messaging client 150 may provide messaging operations in any of a variety of ways. The remote messaging client 150 may be, for example, and without limitation, an electronic mail application, a short-message-service (SMS) message application, a multimedia-message-service (MMS) message application, a group communication application, a telephone voicemail system application, a video-communication application, and so forth. The remote messaging client 150 may accept an address for a recipient, such as an e-mail address, a chat handle, a telephone number, a user name within a social network service, and so forth.

Figure 2:
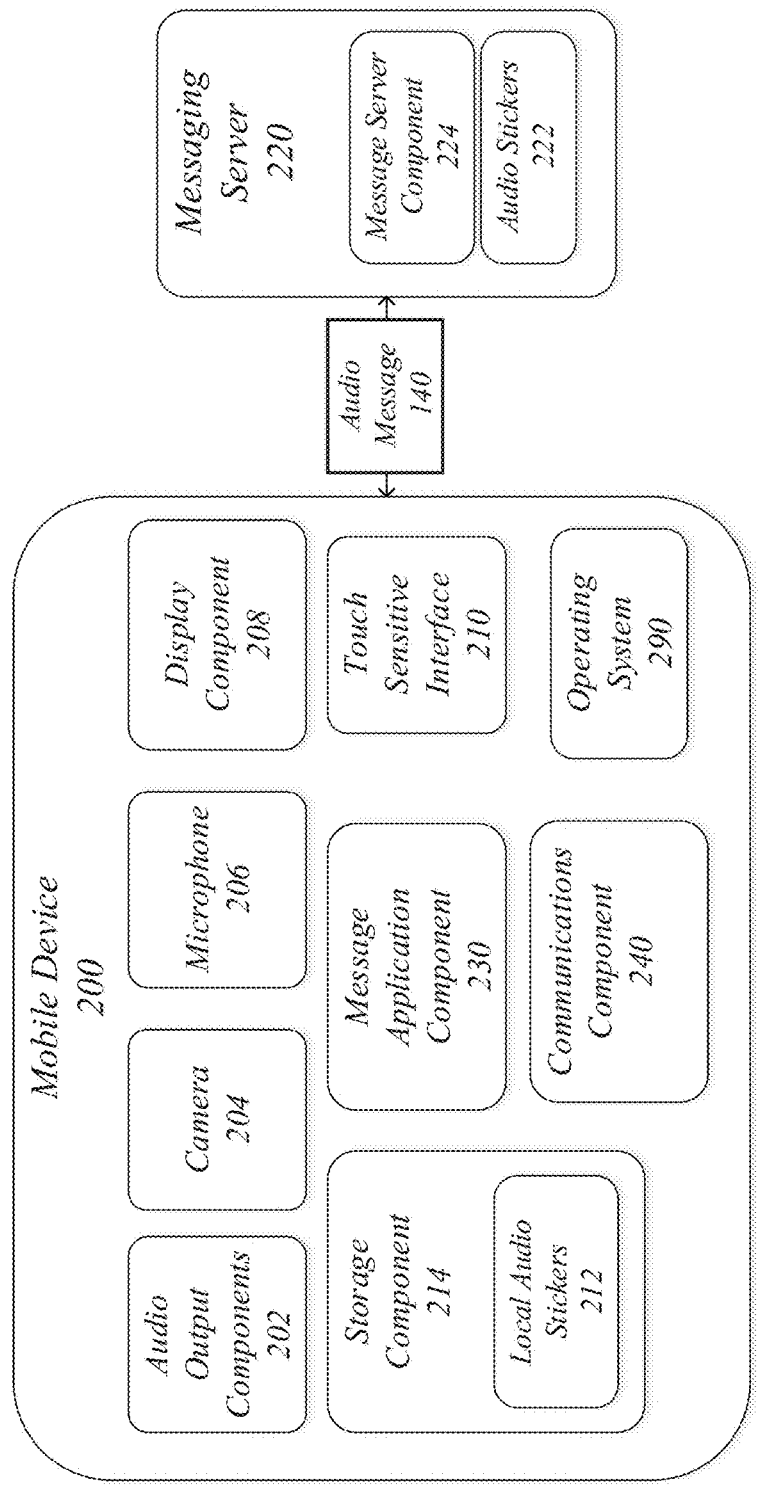
FIG. 2 illustrates an embodiment of a mobile device for the system of FIG. 1.

FIG. 2 illustrates a block diagram of a mobile device 200 and messaging server 220 for the system 100. The mobile device 200 may be an embodiment of mobile device 110. The mobile device 200 may include various hardware components and software components. The hardware components may include various audio output components 202, a camera 204, a microphone 206, a display component 208, and a touch sensitive interface 210. Other hardware components may also be included, such as various other input components, e.g. a keyboard or keypad, as well as a global positioning system (GPS) component, an altimeter, and so forth.

The audio output components 202 may include any components operative to output sound waves, such as an earpiece speaker, a loudspeaker, and/or an audio-out connection. The audio output components 202 may include hardware and/or software that converts between analog and digital sound data.

The camera 204 may be a camera integrated into the mobile device 200 that can take digital photographs through a lens and store the digital photos. In some embodiments, the camera 204 may use the display component 216 to display the scene that will be photographed, and to display stored photos. In some embodiments, the camera 204 may be able to take a photograph from either side of the mobile device 200, e.g. from the front side or from the back side of the mobile device 200.

The microphone 206 may be any device capable of receiving sound waves, e.g. spoken by a human operator, and converting the sound received sound waves into electrical signals and/or data that can be stored and transmitted to other devices. The microphone 206 may be integrated into the mobile device 200, or may be an external microphone coupled to the mobile device 200 wirelessly or through an external wired connection. The microphone 206 may be for example, a component of a head-set, earpiece, or other hands-free communication device that communicates with the mobile device 200 via a short-range signal technology such as BLUETOOTH® technology. The embodiments are not limited to this example.

The display component 208 may include any interface components capable of presenting visual information to the sender, such as, but not limited to, a screen for visual output.

The touch sensitive interface 210 may include a surface that detects touch from, for example, a human finger or a stylus, and converts the touch into a command directive. Various touch gestures that may be detected may include, for example, a single tap, a double tap, a circling gesture, a sliding gesture, a dragging gesture, a multiple-finger gesture, and so forth. The mapping of a touch gesture to a control directive may be dependent on the application operating on the mobile device 200 when the touch is detected, or may be independent of any application. In some embodiments, the display component 208 and the touch sensitive interface 210 may be integrated into one touch sensitive display screen.

The mobile device 200 may further include a storage component 214 in the form of one or more computer-readable storage media capable of storing data and instructions for the functions of software, such as a message application component 230, and an operating system 290. The storage component 214 may store local audio stickers 112. As used herein, "computer-readable storage medium" is not intended to include carrier waves, or propagating electromagnetic or optical signals.

The mobile device 200 may include various software components, such as a message application component 230. The message application component 230 may comprise instructions that when executed by a processing circuit (not shown) cause the mobile device 200 to perform the operations of the message application component 230 as will be described herein. Generally, the message application component 230 may be provided on the mobile device 200 at the time of purchase, or may installed by the sender, and may enable the creation, communication, and playback of messages in audio form, including the use of audio stickers.

The message application component 230 may allow the sender to communicate with others, e.g. with a recipient, by sending and receiving audio messages 140 in a manner analogous to text messaging, and without needing cellular telephone service. For example, the sender may speak a portion of conversation, e.g. "What time are you coming over?", which may be recorded by the microphone 206. The recorded speech may be transmitted as an audio message 140 to the remote messaging client 150, who may then play the message and respond in kind using the remote messaging client 150.

In addition, the message application component 230 may display visual representations of pre-recorded audio files that can be selected by the sender and sent to a recipient. These pre-recorded audio files may be analogous to emoticons or abbreviations. For example, one pre-recorded audio file may be of laughter, and could be used in place of typing "LOL" for "laughing out loud". The visual representations may be visual icons or images that identify the pre-recorded audio file. In some embodiments, the visual representation may pictorially represent the sound, e.g. an icon showing a human face laughing may represent the "LOL" audio file. In some embodiments, the visual representation may not pictorially represent the sound, but may be sufficient to distinguish one pre-recorded sound file from another visually. The combination of a visual representation and a pre-recorded audio file may be referred to herein as an audio sticker.

The message application component 230 may allow a user to select one or more audio stickers to send as an audio message 140. An audio message 140 may include the data of the recorded message, e.g. a data file of the recording, and/or one or more audio stickers. In some embodiments, when an audio sticker is included in an audio message 140, an identifier of the audio sticker may be included in the audio message 140, instead of the actual audio file, as will be discussed further.

The mobile device 200 may store some audio stickers on the device in the local audio stickers 212. The local audio stickers 212 may include audio stickers that were previously received, audio stickers that were previously sent, and/or audio stickers that were created by the operator of the mobile device 200.

Accordingly, the message application component 230 may operate to allow the user of the mobile device 200 to compose and/or record messages, e.g. an audio message 140, to send the message to a recipient, as well as to receive messages from others and present the messages to the user in a way that does not require that the sender and receiver be literate. The message application component 230 will be described in greater detail with respect to FIG. 3.

The mobile device 200 may include a communications component 240. The communications component 240 may include one or more hardware and/or software components that allow the transmission and receiving of signals by the mobile device 200. The communications component 240 may include the hardware and/or instructions to communicate on a data network, such as over a long-term evolution (LTE) network. The communications component 240 may include the hardware and/or instructions to communicate in a shorter-range network, such as by Wi-Fi or by BLUETOOTH®. The communications component 240 may include the hardware and/or instructions to communicate on a cellular telephone network, such as cellular system 130. The communications component 240 may support peer-to-peer network connections, and may be able to detect when other mobile devices are available for a peer-to-peer connection.

The system 100 may also include a messaging server 220. The messaging server 220 may include any computing device capable of communication with other computing devices such as mobile device 110 and remote messaging client 150 over a network to exchange data and instructions. The messaging server 220 may be embodied in a single device or with multiple devices.

The messaging server 220 may store audio stickers 222. The set of audio stickers 222 may be a set of audio stickers available to all users of a messaging service provided by the messaging server 220. Some of the audio stickers 222 may be provided free of charge to the users, while others may have a fee associated with their use. The audio stickers 222 may include professionally produced audio stickers, as well as audio stickers created by the users of the messaging service.

The messaging server 220 may include a message server component 224. The message server component 224 may provide message storage and transmission operations for the messaging service. The operations of the messaging server 220 are described in greater detail with respect to FIG. 5 below.

The mobile device 200 as shown in FIG. 2 is an example and is not limited to the components shown. More, fewer, or other components may be used to provide the described functionality. Additionally, some of the components may be combined into other functional units without departing from the concepts herein.

Figure 3:
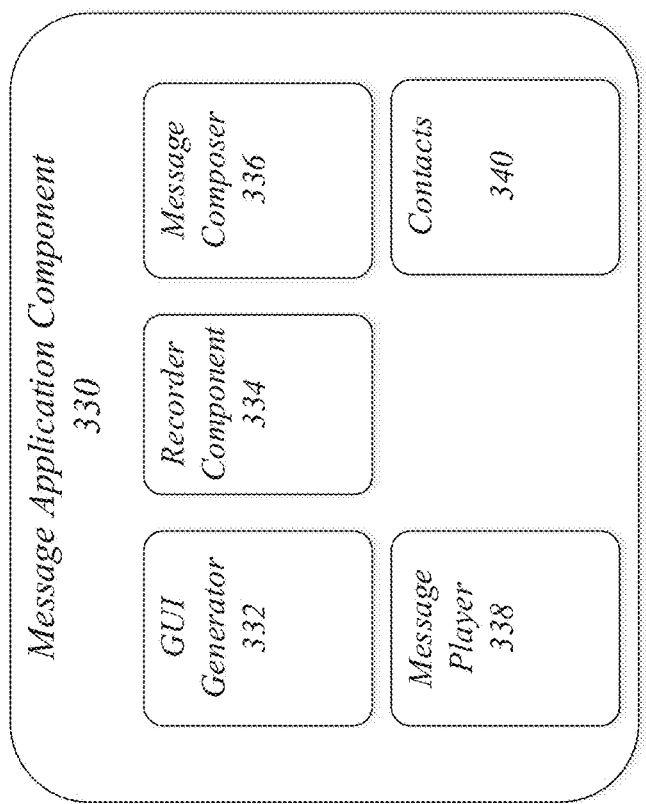
FIG. 3 illustrates an embodiment of a message application component for the system of FIG. 1.

FIG. 3 illustrates a block diagram of a message application component 330 for the system 100. The message application component 330 may be an embodiment of the message application component 230. The message application component 330 may include various functional components to perform the methods and operations described herein, such as, but not limited to, a graphical user interface (GUI) generator 332, a recorder component 334, a message composer 336, and a message player 338. More, fewer, or other components may be used to provide the described functionality. The message application component 330 may also maintain and store a set of contacts 340.

The GUI generator 332 may present various visual elements that convey information to an operator of the device on which the message application component 330 is executing. The visual components may also provide functionality when selected with a control directive, such as a touch gesture. In some embodiments, the message application component 330 may be a textless message application. A textless message application may use little or no alphanumeric text in the visual elements presented by the GUI component 332. In such an embodiment, the GUI generator 332 may present icons, pictures, and/or symbols to convey information, e.g. when a message is received, and indicate control elements, e.g. a playback button. In particular, the GUI generator 332 may present visual representations of audio stickers that the operator can select and send to a recipient.

In other embodiments, the message application component 330 may be a message application that does use alphanumeric text, such as a simple message service (SMS) application, or a social network application that allows its members to communicate with messages. In such an embodiment, the GUI generator 332 may also present text to convey, for example, message content, names or locations of the conversation participants, and so forth.

The recorder component 334 may receive audio input from a microphone, e.g. the microphone 206, and may store the received audio input at least long enough to add the recorded audio to an audio message 140 to send to a recipient. The recorder component 334 may also be used to record and generate an audio file that can be made into an audio sticker.

The message composer 336 may receive input from an operator in the form of an audio recording, a photograph or image, and/or text. The message composer 336 may construct a message for sending to a recipient. When the message is an audio message 140, the message composer 336 may compress the audio data and may place the compressed audio data in the audio message for sending. When the message includes an audio sticker, the message composer 336 may include the audio data portion of the audio sticker, or may include an identifier of the audio sticker without including the audio data portion. The message composer 336 may then send the audio message to the recipient via a communication path to the address of the recipient.

The message player 338 may receive audio messages and cause the audio data portion of the audio message to be output to an audio output component such as a speaker or a headset speaker. The message player 338 may also request and retrieve the audio file using an identifier of the audio file, from a remote data store, such as the messaging server 220, when the audio file is not included in the body of the audio message. The message player 338 may also decrypt and/or decode encrypted and/or compressed audio files prior to playing the audio file.

The contacts 340 may include a list, database or other data structure that stores contact information for people or businesses with which the operator of the mobile device 110 communicates. In some embodiments, the contacts 340 may include members of a social network that have a social network relationship with the operator of the mobile device 110. The information may include a numeric identifier, such as a telephone number or network address that can be used as an end point in a communication path. The information may also include a visual representation of the contact, for example, a photograph, avatar, or other image. The information may also include other address information, such as a mailing address, a physical address, global positioning system (GPS) coordinates, an e-mail address and so forth.

In some embodiments, when the message application component 330 is started up on the mobile device 110, the message composer 336 may attempt to determine whether each contact in the contacts 340 is accessible via some communication path. For example, the message composer 336 may poll nearby mobile devices on a local network such as Wi-Fi or BLUETOOTH® to determine if a communication path to a contact can be formed from one or more peer-to-peer connections. The nearby devices, if enabled to provide peer-to-peer communication, may in turn poll their nearby devices until a communication path is found, or no communication path is found, from available devices. In some embodiments, the message composer 336 may periodically recheck which contacts in the contacts 340 are accessible.

FIGS. 4A-D illustrate various embodiments of audio messages 400 as constructed, for example, by the message composer 336. The audio messages 400 shown in FIGS. 4A-D are examples and are not meant to limit the embodiments to the illustration.

Figure 4A:
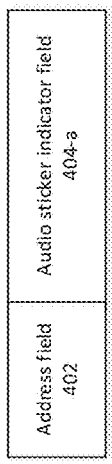
FIGS. 4A-D illustrate embodiments of audio messages for the system of FIG. 1.

FIG. 4A shows an audio message having two fields: an address field 402 and an audio sticker indicator field 404-a. The address field 402 may include any representation of an electronic message address, such as a telephone number of a mobile device, a network address of a mobile device, an electronic mail address, a user account handle for a messaging service and the like. The address field 402 may hold the electronic message address in a binary format.

The audio sticker indicator field 404-a as shown in FIG. 4A may hold an identifier of an audio file, rather than the audio file itself. The identifier may be, for example, a file name, a file storage system address, a uniform resource locator (URL), an identification number used to identify and locate an audio file in a database, and so forth. The audio sticker indicator field 404-a may hold the audio sticker indicator in a binary format.

Figure 4B:

FIG. 4B shows an audio message having two fields: an address field 402 and an audio sticker indicator field 404-b. The audio sticker indicator field 404-b as shown in FIG. 4B may hold the actual audio file portion of an audio sticker. As such, the audio sticker indicator field 404-b may be substantially longer than the audio sticker indicator field 404-a, because audio files typically need many more bits to encode the audio data compared to a numeric identifier. For example, the audio sticker indicator field 404-a may hold on the order of 256 kilobytes, while the audio sticker indicator field 404-b may hold a megabyte or more of data. The embodiments are not limited to these examples.

Figure 4C:
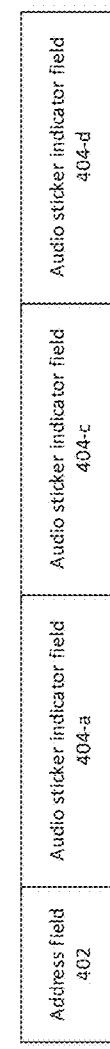

FIG. 4C shows an audio message having more than two fields: an address field 402 and audio sticker indicator fields 404-a, 404-c, and 404-d. The audio sticker indicator fields as shown in FIG. 4C may hold identifiers for three audio files. The audio files may be different from one another, or may be repeated. For example, the audio files corresponding to the identifiers stored in audio sticker indicator fields 404-a and 404-d could be the same audio file. When the audio message shown in FIG. 4C is played for the recipient, the recipient may hear the audio file corresponding to the identifier in field 404-a, followed by the audio file corresponding to the identifier in field 404-c, followed by the audio file corresponding to the identifier in field 404-d.

Figure 4D:

FIG. 4D shows an audio message having more than two fields: an address field 402, an audio sticker indicator field 404-a, and an audio file field 406. The address field 402, and the audio sticker indicator field 404-a may be as previously described. The audio file field 406 may hold the data that encodes an audio file that is not necessarily associated with an audio sticker. For example, the sender may have composed a message starting with an audio sticker, and added a personal greeting or message to the end of the message, recorded from the microphone 206 of their device.

Figure 5:
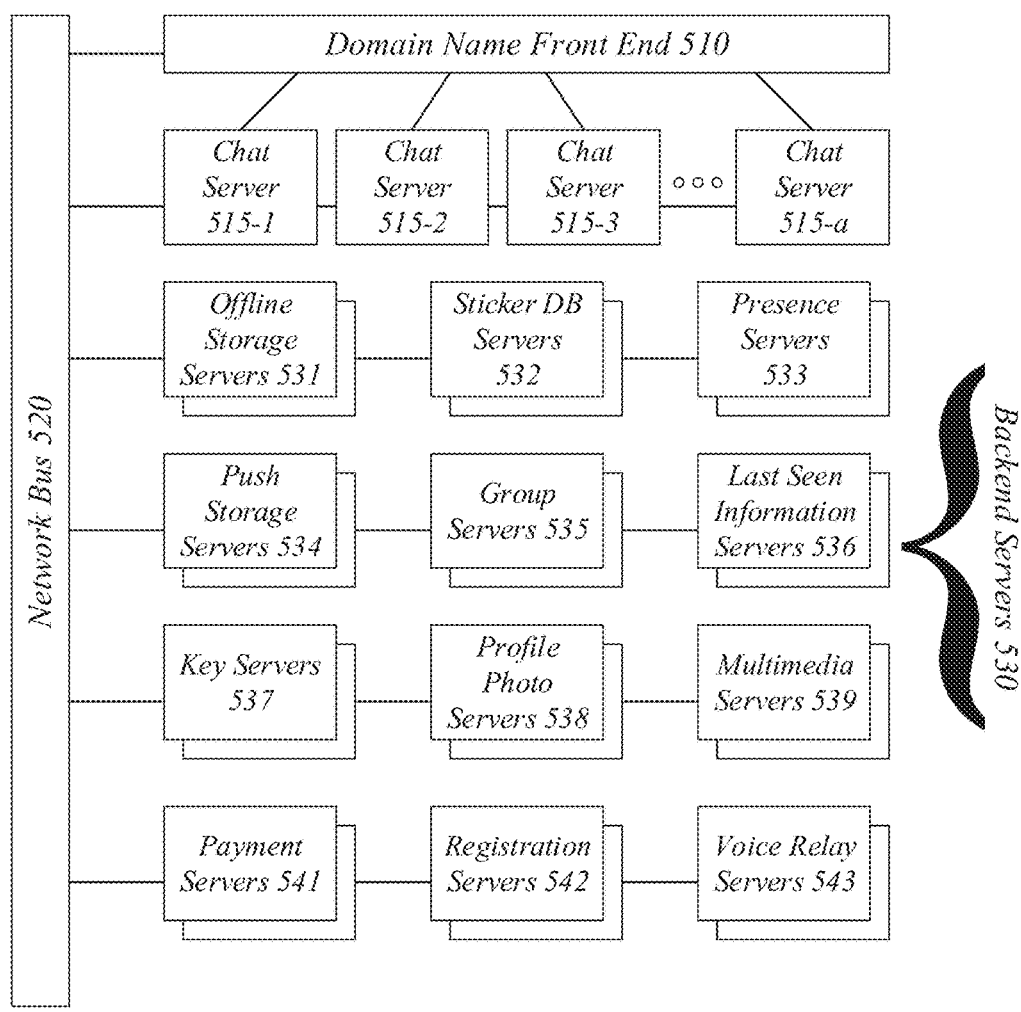
FIG. 5 illustrates an embodiment of a messaging system for the system of FIG. 1.

FIG. 5 illustrates an embodiment of a plurality of servers implementing various functions of a messaging system 500. It will be appreciated that different distributions of work and functions may be used in various embodiments of a messaging system 500. The messaging system 500 may comprise the messaging web access system 100 with the operations of the messaging web access system 100 comprising a portion of the overall operations of the messaging system 500. The messaging system 500 may be an embodiment of the messaging server 220.

The messaging system 500 may comprise a domain name front end 510. The domain name front end 510 may be assigned one or more domain names associated with the messaging system 500 in a domain name system (DNS). The domain name front end 510 may receive incoming connections and distribute the connections to servers providing various messaging services.

The messaging system 500 may comprise one or more chat servers 515. The chat servers 515 may comprise front-end servers for receiving and transmitting user-to-user messaging updates such as chat messages. Incoming connections may be assigned to the chat servers 515 by the domain name front end 510 based on workload balancing.

The messaging system 500 may comprise backend servers 530. The backend servers 530 may perform specialized tasks in the support of the chat operations of the front-end chat servers 515. A plurality of different types of backend servers 530 may be used. It will be appreciated that the assignment of types of tasks to different backend serves 530 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 500 may comprise one or more offline storage servers 531. The one or more offline storage servers 531 may store messaging content for currently-offline messaging endpoints in hold for when the messaging endpoints reconnect.

The messaging system 500 may comprise one or more sticker database servers 532. The one or more sticker database servers 532 may include one or more visual stickers and audio stickers for use by message application components 330. Visual stickers may include graphical images, such as emojis, emoticons, or other images, that are not also associated with an audio file. The audio stickers may include an audio file and a representation of the audio file, for example, an icon or image.

The one or more sticker database servers 532 may allow users of the messaging system 500 to create their own audio stickers and upload them to the messaging system 500 for use by other members. Some audio stickers may be available free of charge, while others may have a fee associated with their use. In some embodiments, the audio stickers may be grouped into sets or collections. When one audio sticker of a set is used, the sender and/or recipient may automatically receive the remaining audio stickers in the set.

The messaging system 500 may comprise one or more presence servers 533. The one or more presence servers 533 may maintain presence information for the messaging system 500. Presence information may correspond to user-specific information indicating whether or not a given user has an online messaging endpoint and is available for chatting, has an online messaging endpoint but is currently away from it, does not have an online messaging endpoint, and any other presence state.

The messaging system 500 may comprise one or more push storage servers 534. The one or more push storage servers 534 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 500 may comprise one or more group servers 535. The one or more group servers 535 may maintain lists of groups, add users to groups, remove users from groups, and perform the reception, caching, and forwarding of group chat messages.

The messaging system 500 may comprise one or more last seen information servers 536. The one or more last seen information servers 536 may receive, store, and maintain information indicating the last seen location, status, messaging endpoint, and other elements of a user's last seen connection to the messaging system 500.

The messaging system 500 may comprise one or more key servers 537. The one or more key servers 537 may host public keys for public/private key encrypted communication.

The messaging system 500 may comprise one or more profile photo servers 538. The one or more profile photo servers 538 may store and make available for retrieval profile photos for the plurality of users of the messaging system 500.

The messaging system 500 may comprise one or more multimedia servers 539. The one or more multimedia servers 539 may store multimedia (e.g., images, video, audio) in transit between messaging endpoints, and multimedia cached for offline endpoints, and may perform transcoding of multimedia.

The messaging system 500 may comprise one or more payment servers 541. The one or more payment servers 541 may process payments from users. Payments may be received, for example, when one or more audio stickers are purchased, and/or when a connection to a cellular data network is purchased. The one or more payment servers 541 may connect to external third-party servers for the performance of payments.

The messaging system 500 may comprise one or more registration servers 542. The one or more registration servers 542 may register new users of the messaging system 500.

The messaging system 500 may comprise one or more voice relay servers 543. The one or more voice relay servers 543 may relay voice-over-internet-protocol (VoIP) voice communication between messaging endpoints for the performance of VoIP calls.

The messaging system 500 may include an authorization server (or other suitable component(s)) that allows users to opt in to or opt out of having their actions logged by the audio messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the audio messaging system 100 and other elements of a social-networking system through blocking, data hashing, anonymization, or other suitable techniques as appropriate.

FIG. 6 illustrates an embodiment of an audio sticker database 600. The audio sticker database 600 may be an example of the audio stickers 222, 532 as stored by a messaging server 220 or messaging system 500. The audio sticker database 600 may store one or more audio stickers, in one or more entries, e.g. entries 602 and 604. Each audio sticker may have at least one entry. An entry for an audio sticker may have fields for, without limitation, an identifier of the audio file (field 610), a visual representation of the audio file (field 620), and/or the audio file itself (field 630). Although the term database is used herein, the audio sticker database 600 can be implemented with any of a variety of other data storage structures, such as, but not limited to, lists, arrays, directory file storage systems, and so forth.

An identifier may be, for example, an alphanumeric string that refers to only one audio file and is useable by, for example, the message server component 224, to retrieve the one audio file from the database to send to a mobile device 110, or a remote messaging client 150. An audio file may have more than one identifier, but an identifier may only refer to one audio file. In some embodiments, the identifier is much smaller, in number of bits, than an audio file, and thus uses fewer network transmission resources.

A visual representation of an audio file may include a visual icon or image that identifies the pre-recorded audio file. In some embodiments, the visual representation may pictorially represent the sound. For example, in entry 602, the visual representation is an icon showing a human face laughing and represents the laughing-out-loud (LOL) audio file. In some embodiments, the visual representation may not pictorially represent the sound, but may be sufficient to distinguish one pre-recorded sound file from another visually. For example, in entry 604, the visual representation includes a number "1" to distinguish its audio file from other audio files within a set of audio files for a musician's album. In the audio sticker database 600, the visual representation may be stored in the database, or alternatively, a storage address for the visual representation may be stored in the database.

The audio file field 630 may store the actual recorded sound for the audio file, or may store a storage address or link to a network location for the audio file. In various embodiments, the audio files of the audio stickers may be of a variety of audio formats, for example, .wav, .mp3, and so forth.

Some audio stickers may be grouped together as sets. For example, and without limitation, frequently-used audio stickers may be provided with the message application component 230. Other sets may be thematically related, or grouped by the creator. Authors and musicians may create sets of audio stickers that include portions of books read aloud, or samples of musical pieces, to generate interest in their work in a format that easy to share. The embodiments are not limited to these examples.

Figure 7:
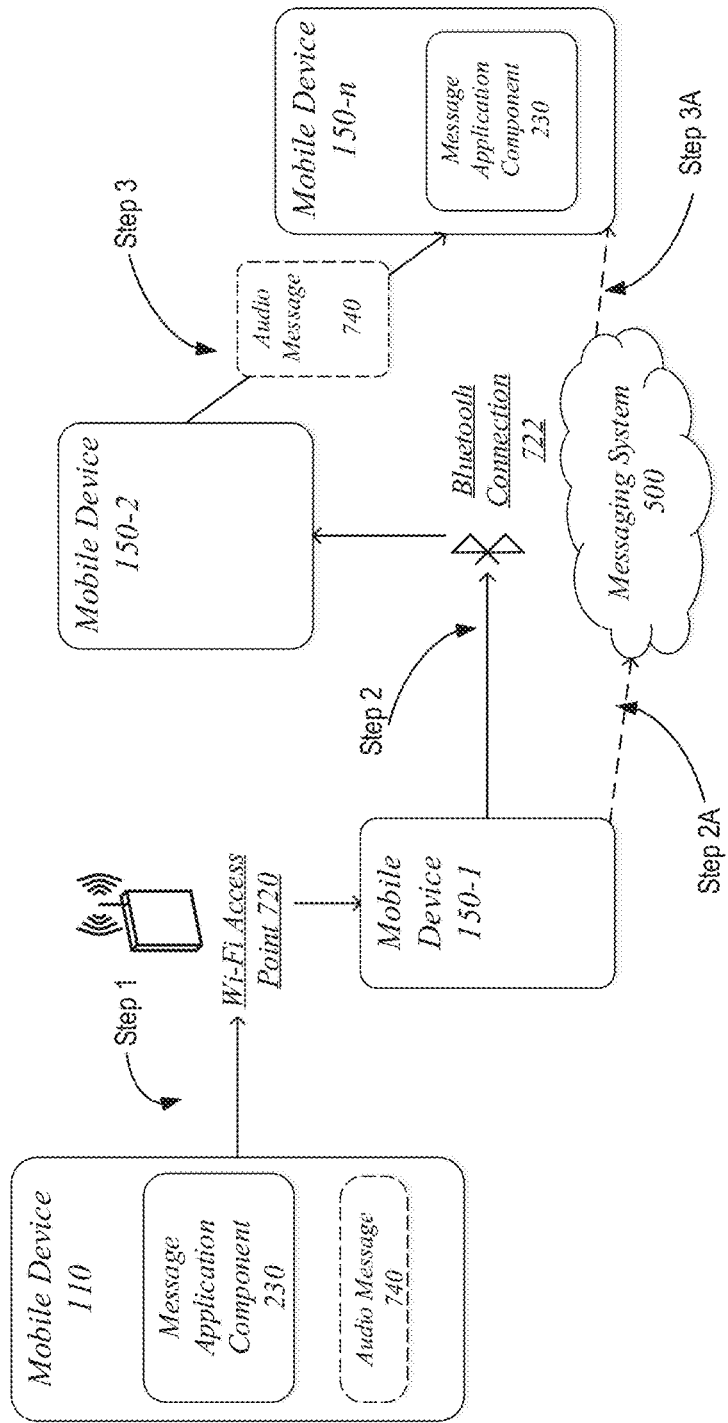
FIG. 7 illustrates an embodiment of a peer-to-peer message delivery system for the system of FIG. 1.

FIG. 7 illustrates a peer-to-peer message delivery flow diagram 700 for the system 100. The diagram 700 illustrates what may occur when a sender, using mobile device 110, tries to send an audio message 740 to a recipient who is using remote messaging client 150-n when the mobile device 110 is not connected to a data network such as a the cellular system 130. In some embodiments, the audio message 740 may be encrypted prior to being sent via a peer-to-peer communication path.

When the message application component 230 starts up, the mobile device 110 may scan local devices, for example, in a Wi-Fi or BLUETOOTH® range, to determine what local devices are enabled to form part of a peer-to-peer network. The mobile device 110 may also communicate with the local device(s) to determine which of the sender's contacts 340 are accessible over a peer-to-peer communication path. A device executing a remote messaging client 150 may be enabled for peer-to-peer connections if its operator has opted-in to allowing such functions.

In the illustrated example, the device executing remote messaging client 150-1 is enabled for peer-to-peer connections. The mobile device 110 sends the audio message 740 to the remote messaging client 150-1 over a peer-to-peer connection via a Wi-Fi access point 720, in Step 1 of the communication path.

The remote messaging client 150-1 may determine what other mobile devices are nearby and enabled for a peer-to-peer connection. In one case, the remote messaging client 150-1 may find the remote messaging client 150-2 and may send the audio message 740 to the remote messaging client 150-2 via a BLUETOOTH® connection 722, in Step 2 of the communication path. The remote messaging client 150-2 may then determine what other mobile devices are nearby and enabled for a peer-to-peer connection. In the illustrated example, the remote messaging client 150-2 finds the remote messaging client 150-n, which is the destination device, and may send the audio message 740 to the remote messaging client 150-n on Step 3 of the communication path using a Wi-Fi or BLUETOOTH® connection (not shown). If the destination device is not within range, then the remote messaging client 150-2, and subsequent mobile devices, may repeat the process of finding a nearby device enabled for peer-to-peer connection, and forwarding the message to the next enabled device in the communication path.

In some embodiments, a hybrid peer-to-peer communication path may be found and used. For example, if the remote messaging client 150-1 has a data connection to the messaging system 500, e.g. using a cellular system 130 (not shown), the remote messaging client 150-1 may send the audio message 740 to the messaging system 500 on Step 2A of the communication path instead of using Step 2. The messaging system 500 may then send the audio message 740 to the destination remote messaging client 150-n on Step 3A of the communication path, or to a device that is both able to communicate with the messaging system 500 and enabled for peer-to-peer connection and is closer to the destination remote messaging client 150-n. The embodiments are not limited to these examples, and any combination of peer-to-peer and data connections may be used to complete a communication path between the mobile device 110 and the remote messaging client 150-n.

Figure 8:
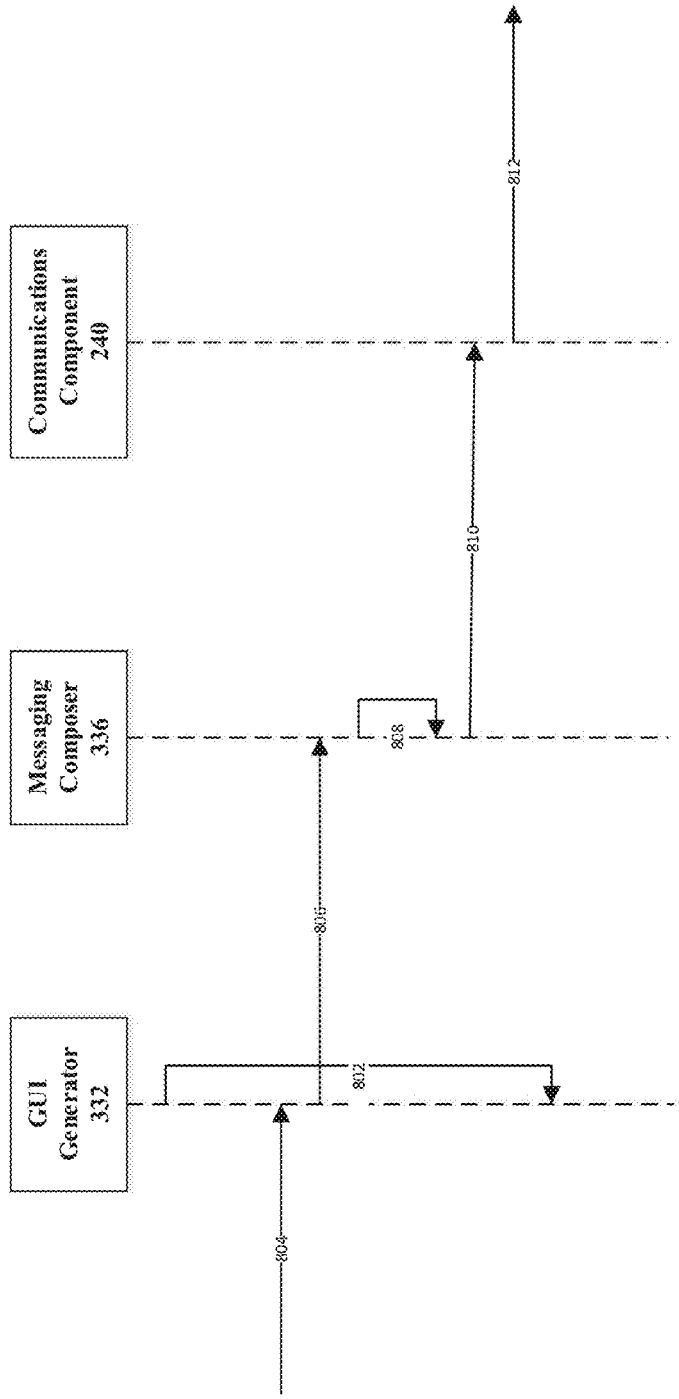
FIG. 8 illustrates an embodiment of a message flow for the system of FIG. 1.

FIG. 8 illustrates an embodiment of a message flow 800 for the system 100. 100. The message flow 800 may represent messages communicated among the components of system 100. As used in FIG. 8, a "message" may include data and/or instructions communicated from one component to another, as well as internal functions within a component, and is distinct from the audio messages 140 sent from a sender to a recipient. In particular, the message flow 800 may occur among the components of the mobile device 110, 200, and more particularly, among the components of the message application component 330.

In message flow 800, time flows from the top of the diagram toward the bottom. Message flow 800 may represent messages communicated during a message communication session where a sender selects an audio sticker to send. The message flow 800 assumes that the message application component 330 is executing on the mobile device 110, 200 and has a communication session open with the recipient.

The message flow 800 begins when the GUI generator 332 displays the user interface for the message application component 330 in message 802. In particular, the displayed UI may include one or more visual representations of audio stickers. The GUI generator 332 may continue displaying the interface throughout the message flow 800.

The message flow 800 continues when the GUI generator 332 receives a control directive selecting an audio sticker in message 804. For example, the GUI generator 332 may receive a tap touch gesture, a touch-and-hold touch gesture, a touch-and-drag touch gesture, a voice command, or any other control directive selecting a visual representation of an audio sticker.

The message flow 800 continues when the GUI generator 332 sends an indicator of the selected audio sticker to the message composer 336 in message 806. The indicator may be the audio file associated with the selected audio sticker, or may be an identifier of the audio file associated with the selected audio sticker.

The message flow 800 continues when the message composer 336 constructs an audio message with the indicator in message 808. The audio message may be in the form of a data packet that includes fields to hold the indicator and a destination for the audio message, e.g. a telephone number, network address, e-mail address and so forth. Generally, an audio message that includes an identifier of an audio sticker will use fewer bits than an audio message that includes the audio file of the audio sticker.

The message flow 800 continues when the message composer 336 provides the audio message to the communications component 240 in message 810. In some embodiments, the message composer 336 may pass the audio message to the communications component 240. In other embodiments, the message composer 336 may store the audio message and may provide a storage location to the communications component 240 to enable the communications component 240 to retrieve the audio message. The embodiments are not limited to these examples.

The message flow 800 continues when the communications component 240 sends the audio message to the recipient on a communication path, in message 812. The communications component 240 may, for example, use a peer-to-peer or hybrid peer-to-peer communication path, as illustrated in FIG. 7, or may use a data network.

Figure 9:
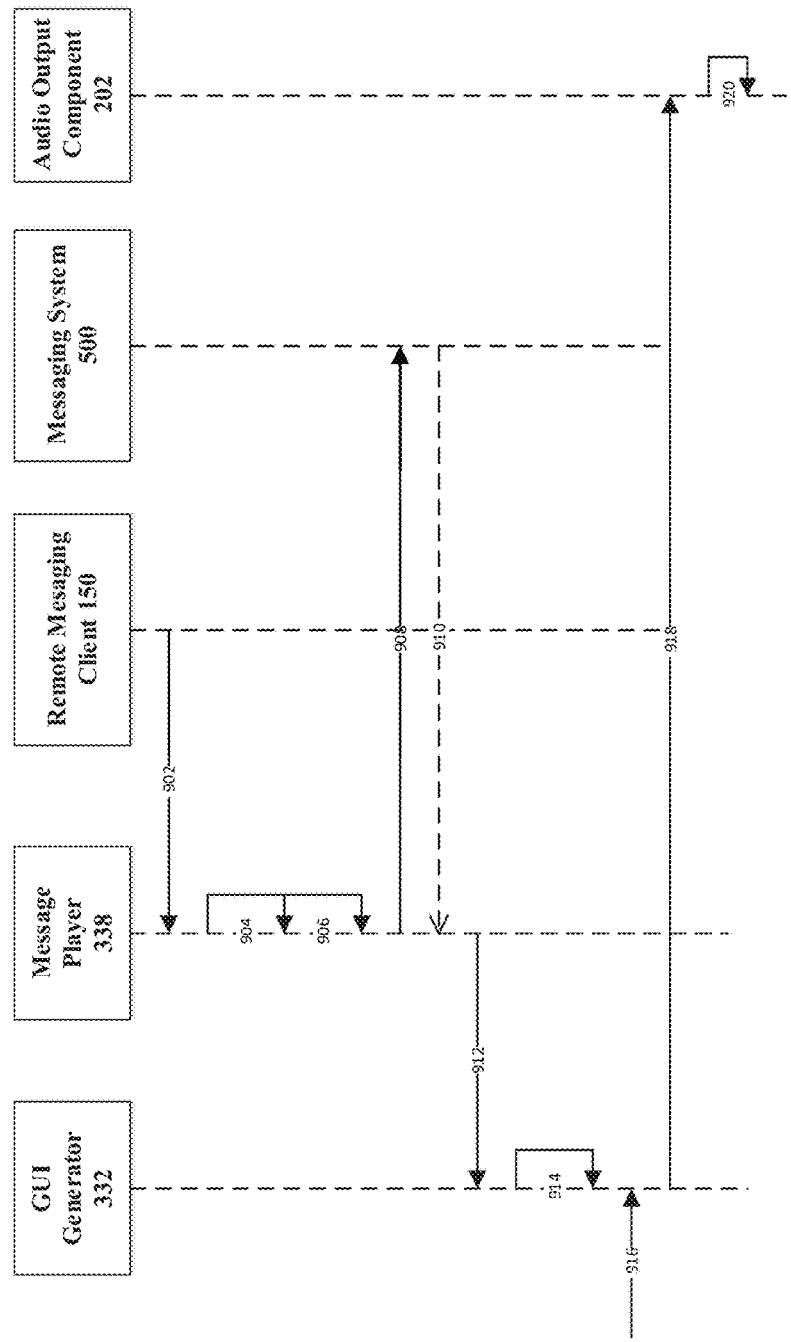
FIG. 9 illustrates an embodiment of a second message flow for the system of FIG. 1.

FIG. 9 illustrates of a message flow 900 for the system 100. The message flow 900 may represent messages communicated among the components of system 100. As used in FIG. 9, a "message" may include data and/or instructions communicated from one component to another, as well as internal functions within a component, and is distinct from the audio messages 140 sent from a sender to a recipient. In particular, the message flow 900 may occur among the components of the mobile device 110, 200, and more particularly, among the components of the message application component 330.

In message flow 900, time flows from the top of the diagram toward the bottom. Message flow 900 may represent messages communicated during a message communication session where an audio message including an audio sticker is received by a mobile device. The message flow 900 assumes that the message application component 330 is executing on the mobile device 110, 200 and has a communication session open with a remote messaging client 150.

The message flow 900 may begin when the remote messaging client 150 sends an audio message in message 902. The message player 338 may receive the message 902. The audio message 140 included in message 902 may include an address field and one or more fields that hold indicators of audio files. In the illustrated embodiment, the indicator may be an identifier of an audio file. In other embodiments, the indicator may be the audio file itself.

The message flow 900 may continue when the message player 338 parses an identifier of an audio file from an audio indicator field of the audio message, in message 904. The message player 338 may, for example, know which field of the audio message holds an indicator and may read the indicator, e.g. an identifier, from the field.

The message flow 900 may continue when the message player 338 may check locally for the audio file corresponding to the parsed identifier in message 906. The message player 338 may check the storage component 214 and the local audio stickers 212 to determine whether the audio file is already stored therein. In the illustrated example, the audio file is not already stored locally.

The message flow 900 may continue when the message player 338 requests the audio file from the messaging system 500 in message 908. The message 908 may include the parsed identifier. The request message 980 may be in any format understandable by the messaging system 500, for example, and without limitation, a database query, a function call, an application program interface (API) call, an HTTP GET request, a URL, and so forth.

The message flow 900 may continue when the messaging system 500 returns the audio file corresponding to the parsed identifier in message 910. The messaging system 500 may use the identifier to locate the audio file, for example, in the sticker DB servers 532. The message 910 may also include the visual representation associated with the audio file. The audio file and the visual representation may be stored locally on the mobile device 110, 200, for example, in the local audio stickers 212.

The message flow 900 may continue when the message player 338 notifies the GUI generator 332 that there is a newly received audio message in message 912. In some embodiments, the message 912 may include the visual representation of the audio file, or a link or reference to the visual representation. In other embodiments, the GUI generator may include instructions that tell the GUI generator 332 where on the mobile device to retrieve visual representations of audio files. The message 912 may occur at any time after receiving the message 902 and the message 914.

The message flow 900 may continue when the GUI generator 332 displays a visual indication that a new unplayed message is received and awaiting playback, in message 914. In some embodiments, the visual representation of the audio file may be displayed near a playback UI element. Alternatively, or in addition, a numeral may be displayed corresponding to a number of unplayed audio messages received. In some embodiments, the GUI generator 332 may also play an audible alert that a new audio message is received, and/or may cause the mobile device 110, 200 to vibrate.

The message flow 900 may continue when the GUI generator 332 receives a control directive selecting to play the received audio message, in message 916. For example, the operator of the mobile device 110, 200 may touch the playback UI element, or may speak a command, e.g. "play message" into the microphone 206.

The message flow 900 may continue when the GUI generator 332 instructs the audio output component 202 to play the audio file, in message 918. In some embodiments, the GUI generator 332 may instruct the message player 338 that the playback control directive was received, and the message player 338 may instruct the audio output component 202 to play the audio file.

The message flow 900 may continue when the audio output component 202 plays the audio file in message 920. The audio file may be output to an earpiece speaker, a loudspeaker, or to an external speaker coupled by wire or wirelessly to the mobile device 110, 200.

Figure 10:
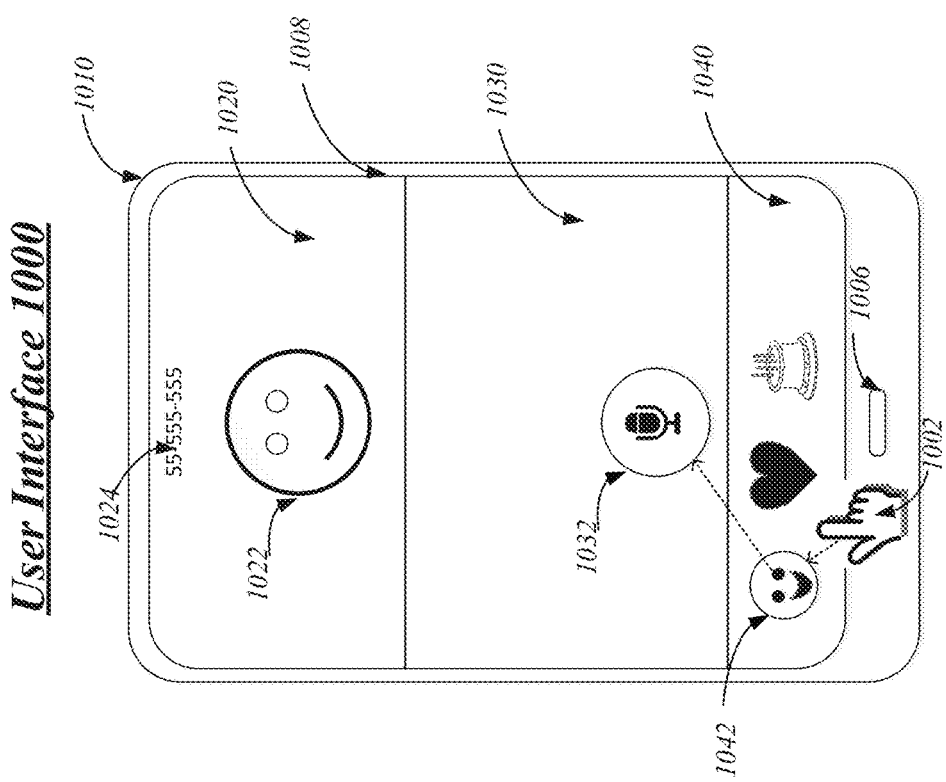
FIG. 10 illustrates a diagram of a user interface for the system of FIG. 1.

FIG. 10 illustrates a user interface (UI) 1000 for the system 100. UI 1000 may be presented on a display component 1008 of mobile device 1010, which may be embodiments of display component 208 and mobile device 110, respectively. In the illustrated example, the UI 1000 is for a textless messaging app. The display component 1008 in the illustrated component may be a touch-sensitive screen. A textless messaging app may represent most or all of its UI elements with pictures rather than alphabetic text. Numerals may be used, for example, to represent telephone numbers.

The UI 1000 may include one or more sections. For example, the UI 1000 may divide the display area of display component 1008 into sections 1020, 1030 and 1040. More, fewer or different sections may also be used.

Section 1020 may display information about the entity ("the recipient") with whom the operator ("the sender") of the device 1010 is communicating. The information may include, without limitation, a graphical representation 1022 and a numeric identifier 1024. The graphical representation 1022 may be a photograph of the recipient, or some other icon or graphic chosen by either the sender or the recipient to represent the recipient. The numeric identifier 1024 may be a telephone number or network address of the device executing the remote messaging client 150 used by the recipient, or any other number or numeric sequence that identifies the recipient via the device executing the remote messaging client 150. In some embodiments, the numeric identifier 1024 may also be the addressing information used by the messaging app to connect to and communicate with the remote messaging client 150.

Section 1030 may display information about the current state of communication with the recipient and functional UI elements. In the illustrated example, section 1030 displays a send icon 1032. In some embodiments, the sender may touch or tap the send icon 1032 to activate the microphone 1006, and then speak his message into the microphone 1006. Tapping or touching the send icon 1032 again may send the spoken message to the recipient. In other embodiments, the sender may just start talking into the microphone 1006, and then tap or touch the send icon to send what was spoken. As shown in FIG. 10, no unsent or unheard communications are pending.

Section 1040 may display visual representations of audio stickers, such as representation 1042. The sender may perform one or more touch gestures using his finger 1002 to select a representation and send it and its corresponding audio sticker to the recipient. For example, the sender may touch and drag the representation 1042 to the send icon 1032 to send the audio sticker associated with the representation 1042. The sender may tap the representation 1042 and then tap the send icon 1032 to send the audio sticker associated with the representation 1042. The embodiments are not limited to these examples.

The sender may be able to hear the audio sticker associated with a representation, for example, by double-tapping the representation 1042, or by touching and holding the representation 1042 for a predetermined period of time, at which point the audio file associated with the audio sticker may be output through an audio output component of the device 1010.

The sender may be able to send a sequence of audio stickers to the recipient. For example, after dragging the representation 1042 to the send icon 1032, the sender may drag a second representation, e.g. the heart shaped representation, to the send icon 1032. Then both, or more, audio stickers may be sent to the recipient.

Figure 11:
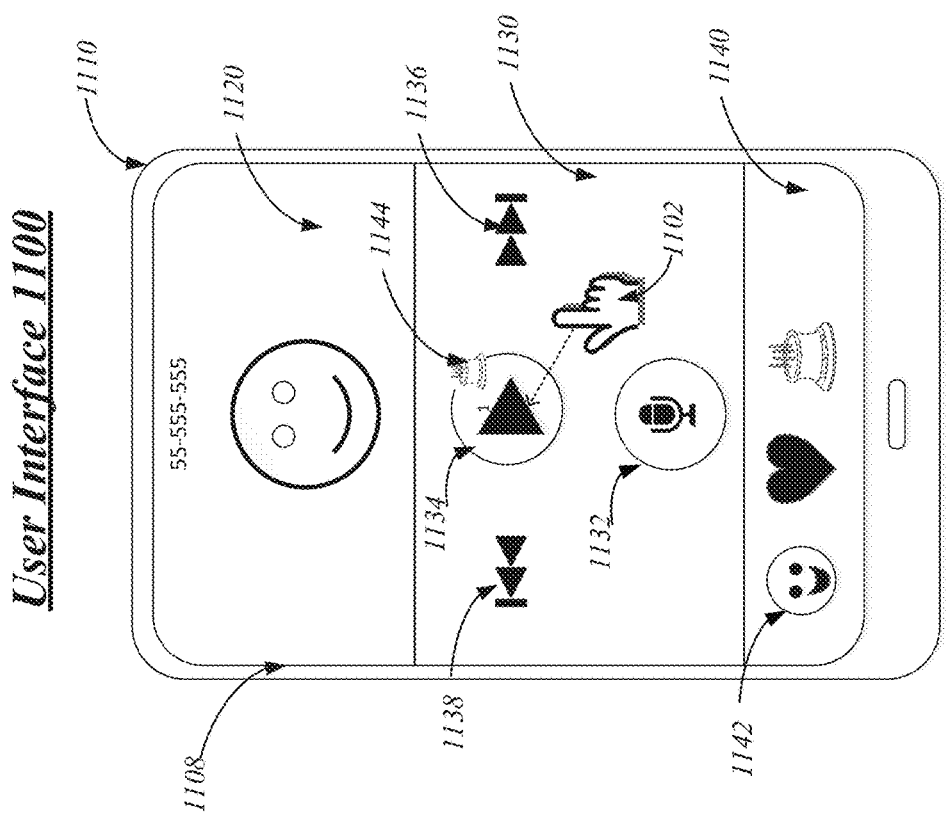
FIG. 11 illustrates a diagram of a second user interface for the system of FIG. 1.

FIG. 11 illustrates a user interface (UI) 1100. The UI 1100 may be presented on a display component 1108 of mobile device 1110, which may be embodiments of display component 208 and mobile device 110, respectively. The UI 1100 may be very similar to the UI 1000 and/or may be the UI 1000 in a different state. For example, the sections 1120, 1230 and 1140 may be analogous to sections 1020, 1030, and 1040, respectively. The send icon 1132 and the representation 1142 may be the same or analogous to the send icon 1032 and the representation 1042, respectively.

In the illustrated example, the operator of the mobile device 1110 has received an audio sticker message. When a message is received by the messaging application, the UI 1100 may display visual indications that a message is received in section 1230. For example, the UI 1100 may display playback UI elements, such as a "play" icon 1134, a "next" icon 1136 and a "rewind" icon 1138. The play icon 1134, when selected, for example, with a touch gesture from operator 1102, may output the audio portion of the received message. While the audio message is being output, the play icon 1134 may change to a "pause" icon (not shown). The next icon 1136, when selected, may play a next, later-received, audio message in a sequence, when more than one audio message has been received. The rewind icon 1138, when selected, may restart playing the currently playing audio message from the beginning, or may play an earlier received audio message.

In addition to the playback controls, the UI 1100 may also display information, such as a representation 1144 of a received audio sticker. The UI 1100 may also display a numeral near the play icon 1134, or elsewhere in section 1230, to indicate a number of unheard messages received from the recipient shown in section 1120.

Figure 12:
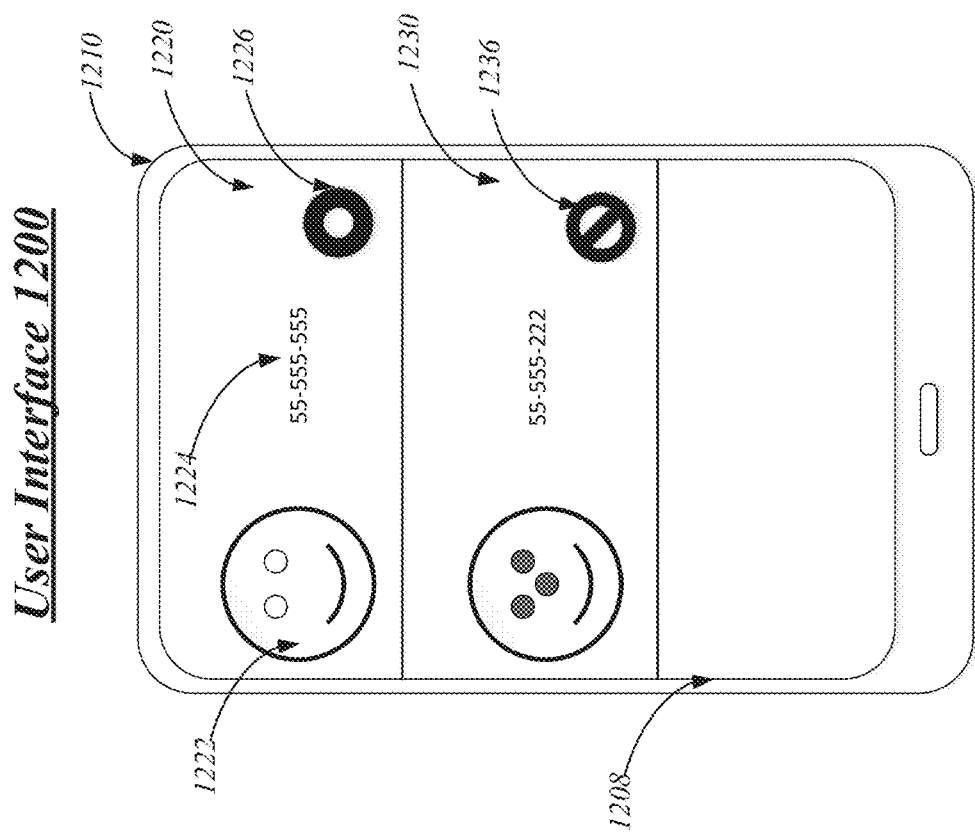
FIG. 12 illustrates a diagram of a third user interface for the system of FIG. 1.

FIG. 12 illustrates a user interface (UI) 1200. The UI 1200 may be presented on a display component 1208 of mobile device 1210, which may be embodiments of display component 208 and mobile device 110, respectively. In the illustrated example, the UI 1200 is for a textless messaging app. The UI 1200 may display the stored contacts of the operator of the mobile device 1210. For example, the UI 1200 may show a listing for a contact 1202 and a listing for a contact 1230.

Each listing may include a representation 1222 of a contact, which may be the representation 1022 shown in section 1020 of UI 1000. Each listing may also include one or more numeric identifiers 1224 for the contact.

In an embodiment, each listing may include a visual connectivity icon, e.g. icons 1226 and 1236. The connectivity icon may indicate whether the contact is currently accessible via one or more communication paths, such as via a data network, or via a peer-to-peer network. For example, the connectivity icon 1226 may indicate that the contact in listing 1220 is available and would receive an audio message in the time it takes the message to traverse the communication path. The connectivity icon 1236 may indicate that the contact in listing 1230 is not currently available through any communication path. Messages sent to the contact in listing 1230 may not be received by that contact until a communication path is established. The message may be stored on the mobile device 1210, or on a remote device that is part of a communication path to the contact until the recipient is available to receive the audio message.

In an embodiment, the operator of the mobile device 1210 may use a touch gesture or other control directive to select a contact from UI 1200 with whom to exchange a messaging conversation. Selecting a contact from UI 1200 may change the display to one as seen in UI 1000.

Figure 13:
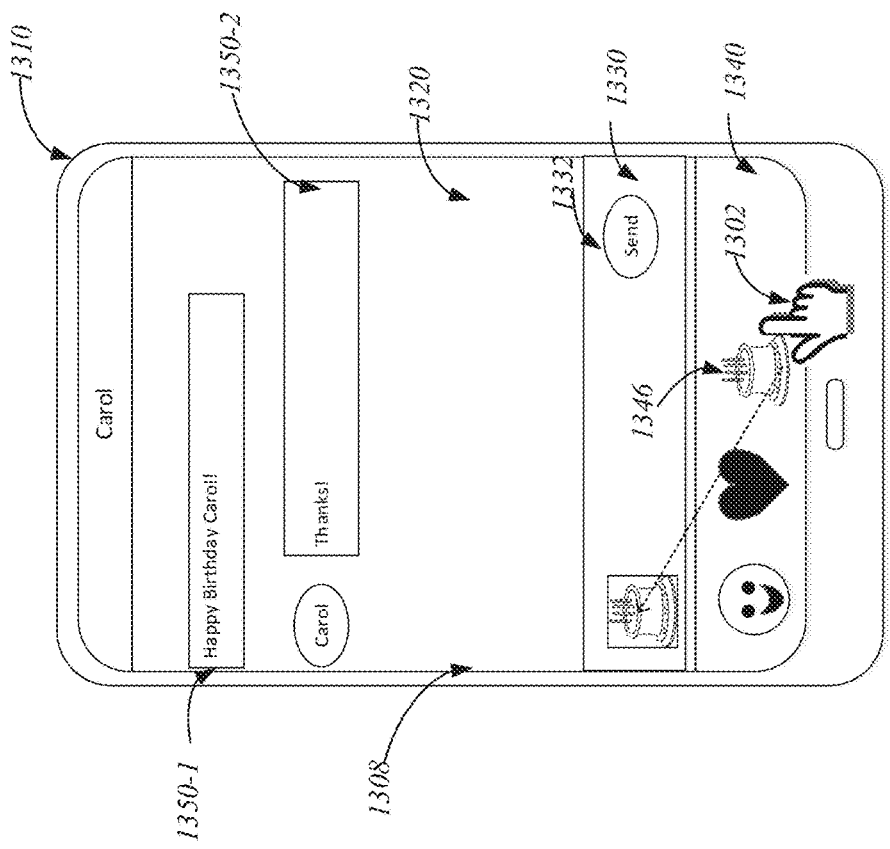
FIG. 13 illustrates a diagram of a fourth user interface for the system of FIG. 1.

FIG. 13 illustrates a user interface (UI) 1300. The UI 1300 may be presented on a display component 1308 of mobile device 1310, which may be embodiments of display component 208 and mobile device 110 or 150, respectively. In the illustrated example, the UI 1300 is for a messaging application that does use alphanumeric text.

The UI 1300 may divide the display component 1308 into several sections. For example, the display component 1308 may be divided into section 1320, section 1330, and section 1340. More, fewer or other sections may be used.

Section 1320 may be used to present the text messages exchanged between the operator 1302 of the mobile device 1310 and another device, in this example, a device operated by "Carol." In the illustrated example, the presented messages include messages 1350-1 and 1350-2.

Section 1330 may provide a message composition area, where the operator 1302 may input a touch gesture control directive to input text for a message. The touch gesture control directive may, for example, bring up a touch-sensitive keyboard display for text entry, or may activate a microphone for speech-to-text entry, or may accept input from a stylus and perform optical character recognition on handwriting from the stylus.

Section 1330 may also accept a representation 1346 of an audio sticker that may be dragged or otherwise selected and placed into section 1330 from section 1340. The operator 1302 may then perform a control directive on the send button 1332 to send the audio sticker to Carol. Alternatively, the representation 1346 may be dragged or otherwise selected directly into section 1320 for transmission to the recipient Carol. The embodiments are not limited to these examples.

Figure 14:
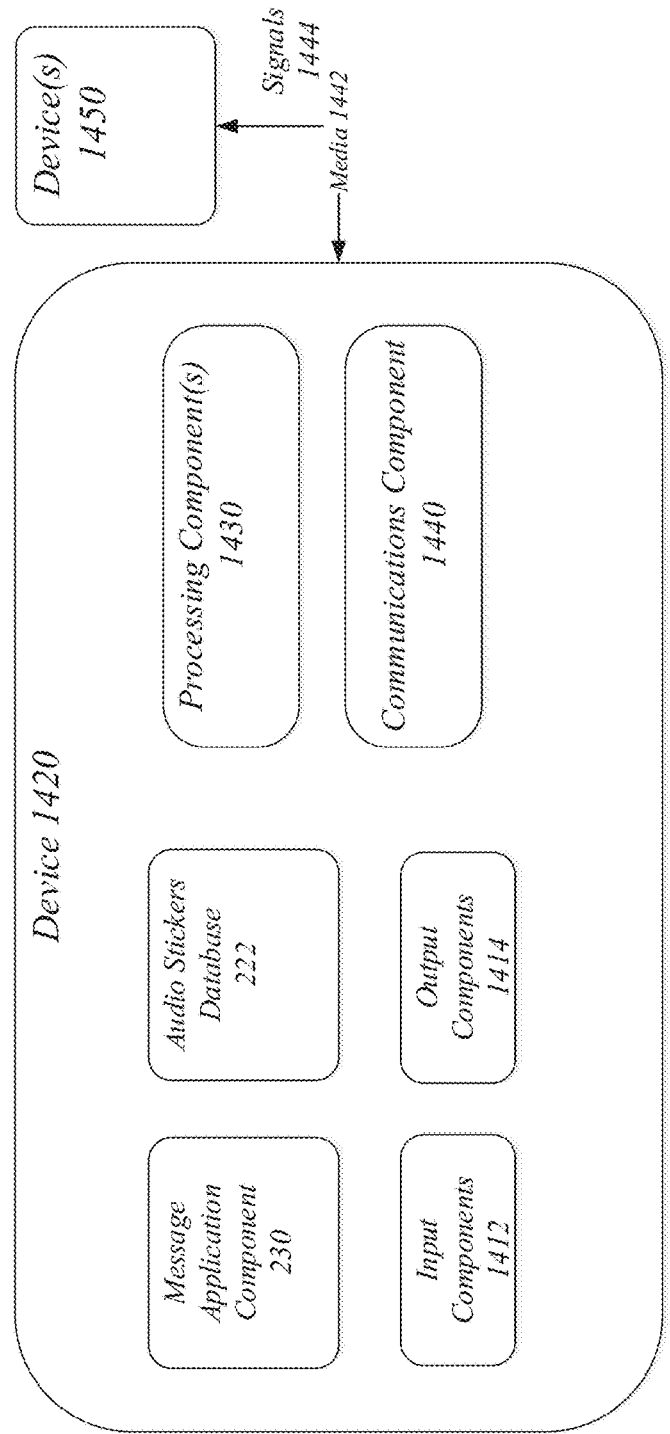
FIG. 14 illustrates an embodiment of a centralized system for the system of FIG. 1.

FIG. 14 illustrates a centralized system 1400. The centralized system 1400 may implement some or all of the structure and/or operations for the system 140 for securing delivery of an audio message in a single computing entity, such as entirely within a single device 1420. In an embodiment, the centralized system 1400 may provide the functionality described above without the use of a messaging server 220 or messaging system 500.

The device 1420 may comprise any electronic device capable of receiving, processing, and sending information, and may be an embodiment of a mobile device, e.g. mobile device 110 or 200. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1420 may execute processing operations or logic for the system 100 using a processing component 1430. The processing component 1430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1420 may execute communications operations or logic for the system 100 using communications component 1440. The communications component 1440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1412 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1420 may communicate with other devices 1450 over a communications media 1442 using communications signals 1444 via the communications component 1440. The devices 1450 may be internal or external to the device 1420 as desired for a given implementation.

The device 1420 may include within it the message application component 230 and the audio stickers database 222. The device 1420 may include within it various input components 1412, which may include keyboards, touch-sensitive interfaces, microphones, cameras, and the like, for example, as shown in FIG. 2. The device 1420 may include within it various output components 1414, which may include speakers, displays, and the like, for example as shown in FIG. 2. Device 1420 may be operative to carry out the tasks of these elements using processing component 1430 and communications component 1440. Devices 1450 may comprise any of devices 110 or 150, the signals 1414 over media 1412 comprising the interactions between the device 1420 and its elements and these respective devices.

Figure 15:
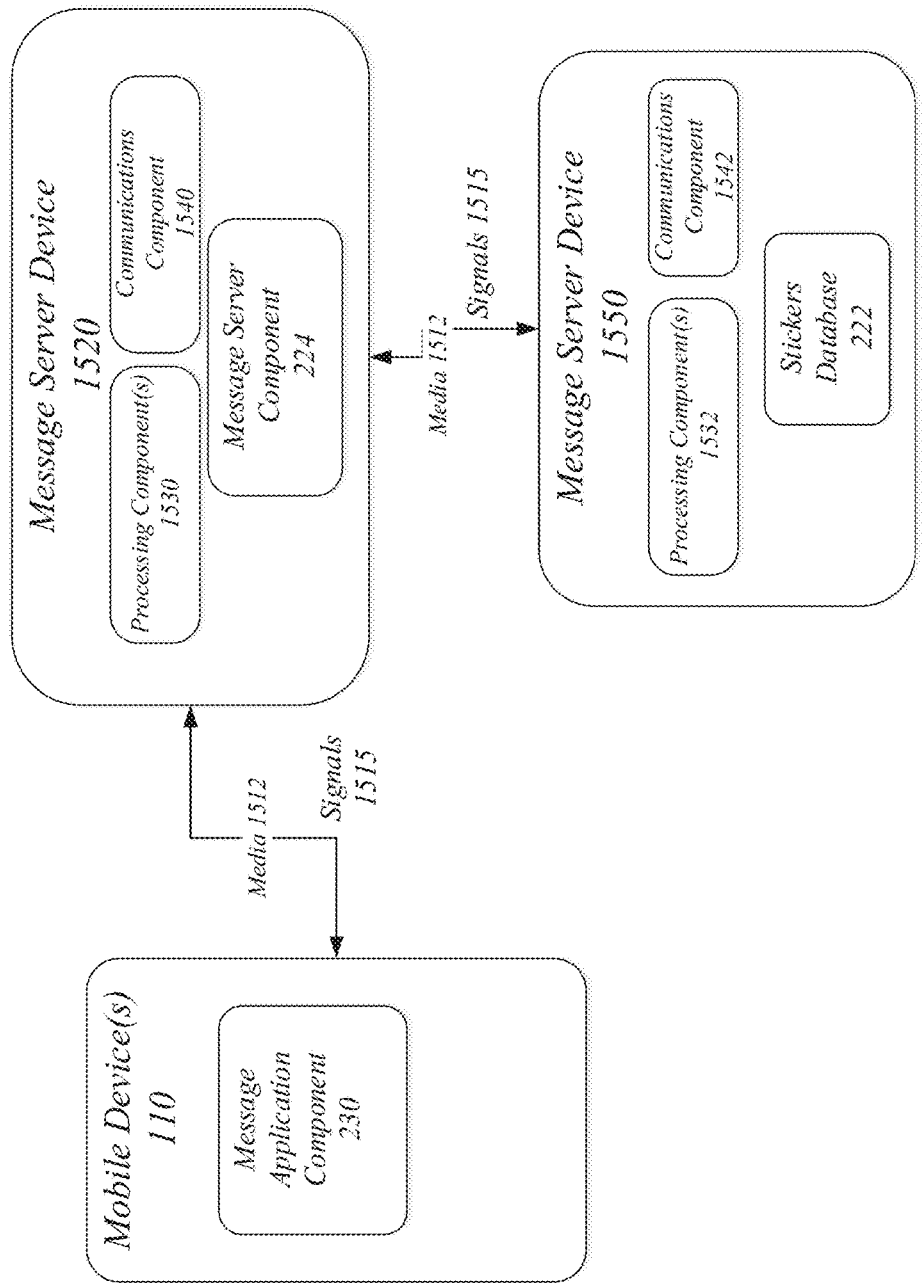
FIG. 15 illustrates an embodiment of a distributed system for the system of FIG. 1.

FIG. 15 illustrates an embodiment of a distributed system 1500. The distributed system 1500 may distribute portions of the structure and/or operations for the system 100 across multiple computing entities. Examples of distributed system 1500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1500 may comprise message server devices 1520 and 1550. In general, the message server devices 1520 and 1550 may be similar to the device 1420 as described with reference to FIG. 14. For instance, the message server devices 1520 and 1550 may each comprise, respectively, a processing component 1530, 1532 and a communications component 1540, 1542, which are the same or similar to the processing component 1430 and the communications component 1440, respectively, as described with reference to FIG. 14. In another example, the message server devices 1520 and 1550 may communicate over a communications media 1512 using communications signals 1514 via the communications components 1540, 1542.

The message server devices 1520 and 1550 may comprise or employ one or more server programs that operate to perform various methodologies in accordance with the described embodiments. For example, message server device 1520 may implement the message server component 224. The message server device 1550 may implement the audio stickers database 222. It will be appreciated the server device 1520—or any of the server devices—may itself comprise multiple servers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 16:
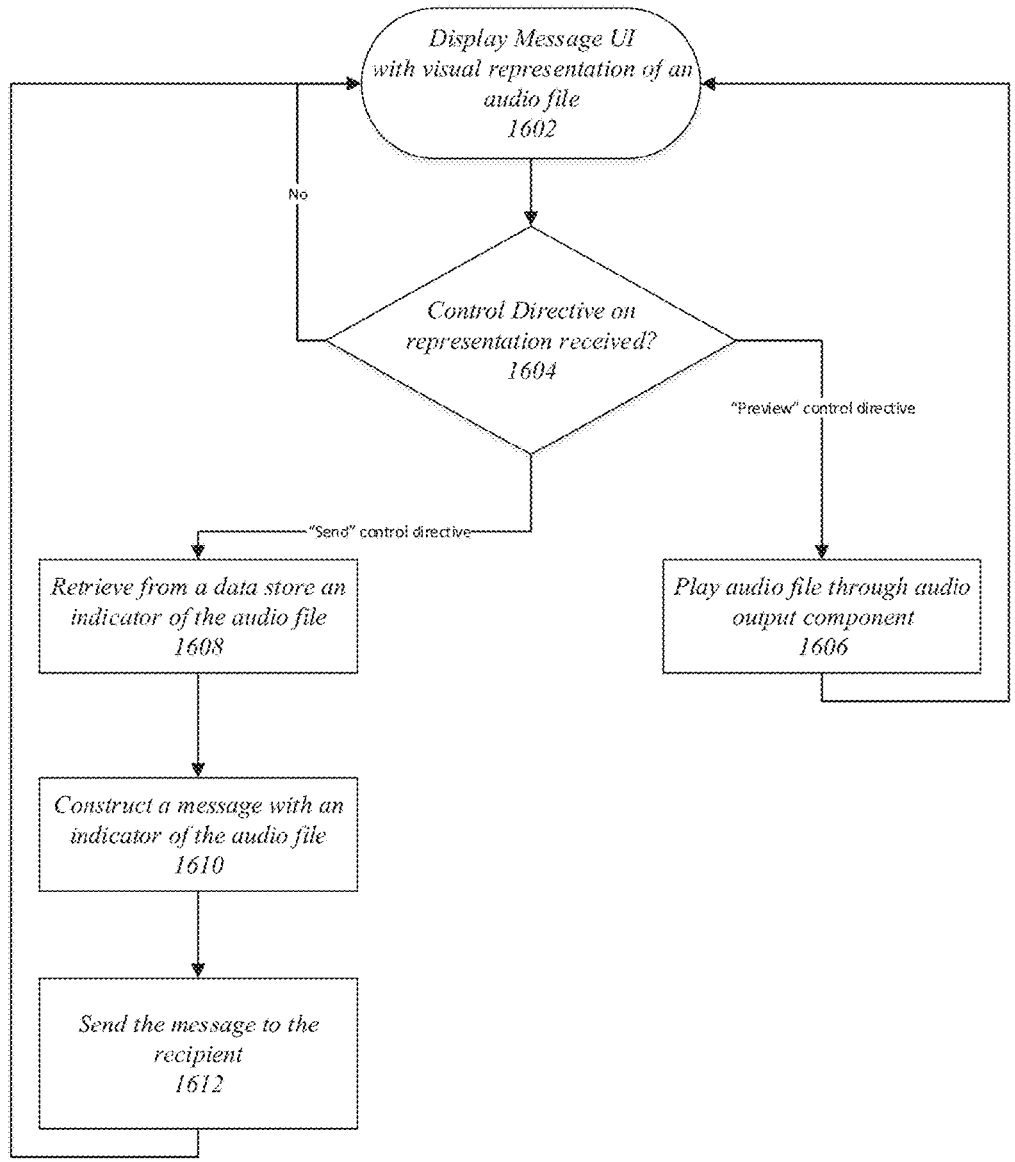
FIG. 16 illustrates an embodiment of a logic flow for the system of FIG. 1.

FIG. 16 illustrates an embodiment of a logic flow 1600 for the system 100. The logic flow 1600 may be representative of some or all of the operations executed by one or more embodiments described herein. The operations of the logic flow 1600 may be performed by a message application component 230 on a mobile device 110.

In the illustrated embodiment shown in FIG. 16, the logic flow 1600 may be operative at block 1602 to display a message user interface (UI) with a visual representation of an audio file. For example, the GUI generator 332 may present one or more visual representations, such as icons, graphics, or photos, in a portion of the UI for a messaging application. Each visual representation may be associated with a separate audio file.

The logic flow 1600 may be operative at block 1604 to determine whether a control directive has been received on the visual representation. For example, the GUI generator 332 may monitor a touch-sensitive interface or other input components until a control directive such as a touch gesture or a spoken command is received. For example, an operator of the mobile device 110 may tap or touch a visual representation, or may touch and drag the visual representation to another portion of the displayed UI. Alternatively, an operating system of the mobile device may perform the monitoring, and may inform the messaging application when a control directive is received on or selecting a visual representation.

The logic flow 1600 may proceed to block 1606 when a "preview" control directive is received. A preview control directive may include, for example, a touch and hold gesture for a defined period, e.g. 3 seconds, or a double- or triple-tap gesture. The logic flow 1600 may proceed to block 1608 when a "send" control directive is received. A "send" control directive may include, for example and without limitation, a touch and release gesture, or a touch and drag gesture beginning on the visual representation and ending on a UI element for sending a message.

The logic flow 1600 may be operative at block 1606 to play the audio file associated with the visual representation through an audio output component on the mobile device 110 in response to a "preview" control directive. A preview control directive allows the operator to hear the audio file associated with a visual representation prior to sending the audio file, to ensure that the intended audio file is sent. When the full audio file is already stored on the mobile device 110, the message player 338 may direct an audio output component 202, e.g. an earpiece speaker, to play the audio file as a preview. When the full audio file is not stored locally on the mobile device 110, the message player 338 may request and retrieve the audio file from a data store using an identifier of the audio file from a remote data store, such as the messaging server 220, before outputting the audio file to an audio output component 202.

The logic flow 1600 may be operative at block 1608 to retrieve an indicator of the audio file from a data store when a "send" control directive is received. The message composer 336 may retrieve an indicator of the audio file associated with the selected visual representation from the local storage component 214, or from a remote data store, such as the messaging server 220. The indicator may be the audio file itself, or may be an identifier associated with the audio file.

The logic flow 1600 may be operative at block 1610 to construct a message with the indicator of the audio file. For example, the message composer 336 may create an audio message having one or more fields, including an address field and at least one indicator field. The address field may be used to hold an electronic message address such as a phone number, network address or message account identifier for the recipient. The indicator field may be used to hold the indicator. In some embodiments, when a full audio file is included in an audio message, the message composer 336 may compress the audio file before inserting the audio file into the audio message, and/or may encrypt some or all of the audio message.

The logic flow 1600 may be operative at block 1612 to send the message to the recipient. For example, the message composer 336 may use the communications component 240 to send the message via at least one of a cellular system or one or more Wi-Fi access points to the recipient.

Figure 17:
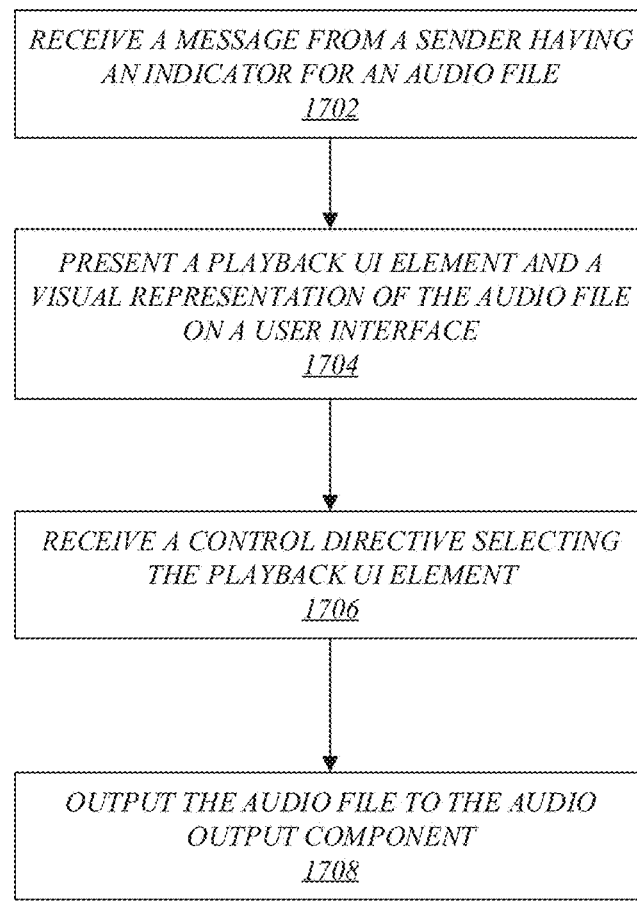
FIG. 17 illustrates an embodiment of a second logic flow for the system of FIG. 1.

FIG. 17 illustrates an embodiment of a logic flow 1700 for the system 100. The logic flow 1700 may be representative of some or all of the operations executed by one or more embodiments described herein. The operations of the logic flow 1700 may be performed by the mobile device 110 when an audio message is received by the mobile device.

In the illustrated embodiment shown in FIG. 17, the logic flow 1700 may begin at block 1702 when the mobile device 110 receives a message from a sender having an indicator for an audio file. In particular, the message may include an audio file or an identifier for an audio file. The audio file may be part of an audio sticker, and may be associated with a visual representation, such as an icon.

The logic flow 1700 may be operative at block 1704 to present a playback user interface (UI) element and a visual representation of the audio file on a user interface of the messaging application. For example, the GUI generator 332 may display the conventional triangle that represents a "play" function. The GUI generator 332 may also display the visual representation near the playback UI element, or elsewhere on the display. The visual representation may be displayed at full size or in a reduced size. In some embodiments, the visual representation may not be displayed, or may be presented as a numeral indicating how many unplayed audio messages have been received.

The logic flow 1700 may be operative at block 1706 to receive a control directive selecting the playback UI element. For example, the GUI generator 332 may detect a touch gesture on or near the playback UI element, or may detect a spoken command directive via the microphone 206. The GUI generator 332 may direct the message player 338 to play the audio file.

The logic flow 1700 may be operative at block 1708 to output the audio file to an audio output component. For example, when the full audio file is received in the audio message, the message player 338 may direct an audio output component 202, e.g. an earpiece speaker, to play the audio file. When the received message includes an identifier of an audio file, the message player 338 may request and retrieve the corresponding audio file from a data store, either locally on the mobile device 110 or on a remote data store such as the messaging server 220, before outputting the audio file to an audio output component 202.

Figure 18:
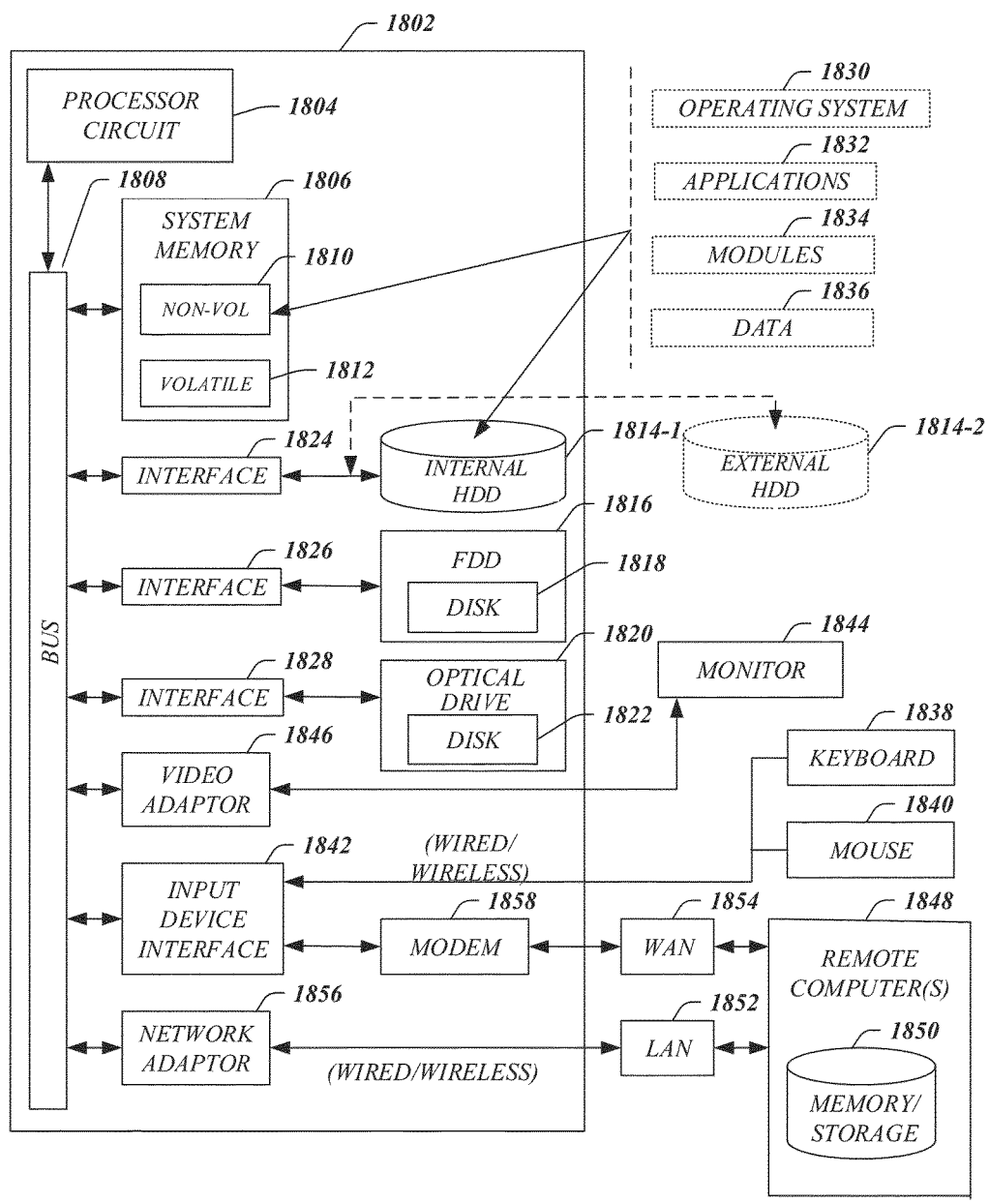
FIG. 18 illustrates an embodiment of a computing architecture.

FIG. 18 illustrates an embodiment of an exemplary computing architecture 1800 suitable for implementing various embodiments as previously described. In one embodiment, the computing architecture 1800 may comprise or be implemented as part of an electronic device. Examples of an electronic device may include those described with reference to FIGS. 14-15, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1800.

As shown in FIG. 18, the computing architecture 1800 comprises a processing circuit 1804, a system memory 1806 and a system bus 1808. The processing circuit 1804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing circuit 1804.

The system bus 1808 provides an interface for system components including, but not limited to, the system memory 1806 to the processing circuit 1804. The system bus 1808 can be any of several types of bus structure that may further interconnect to a memory bus (with or without a memory controller), a peripheral bus, and a local bus using any of a variety of commercially available bus architectures. Interface adapters may connect to the system bus 1808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 18, the system memory 1806 can include non-volatile memory 1810 and/or volatile memory 1812. A basic input/output system (BIOS) can be stored in the non-volatile memory 1810.

The computer 1802 may include various types of computer-readable storage media in the form of one or more lower speed memory units, including an internal (or external) hard disk drive (HDD) 1814-1 and 1814-2, respectively, a magnetic floppy disk drive (FDD) 1816 to read from or write to a removable magnetic disk 1818, and an optical disk drive 1820 to read from or write to a removable optical disk 1822 (e.g., a CD-ROM or DVD). The HDD 1814, FDD 1816 and optical disk drive 1820 can be connected to the system bus 1808 by a HDD interface 1824, an FDD interface 1826 and an optical drive interface 1828, respectively. The HDD interface 1824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1810, 1812, including an operating system 1830, one or more application programs 1832, other program modules 1834, and program data 1836. In one embodiment, the one or more application programs 1832, other program modules 1834, and program data 1836 can include, for example, the various applications and/or components of the message application component 230, 330; and the message server component 224.

An operator can enter commands and information into the computer 1802 through one or more wire/wireless input devices, for example, a keyboard 1838 and a pointing device, such as a mouse 1840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing circuit 1804 through an input device interface 1842 that is coupled to the system bus 1808, but can be connected by other interfaces such as a parallel port, IEEE 1394 serial port, a game port, a USB port, an IR interface, and so forth.

A monitor 1844 or other type of display device is also connected to the system bus 1808 via an interface, such as a video adaptor 1846. The monitor 1844 may be internal or external to the computer 1802. In addition to the monitor 1844, a computer typically includes other peripheral output devices, such as speakers, printers, and so forth.

The computer 1802 may operate in a networked environment using logical connections via wire and/or wireless communications to one or more remote computers, such as a remote computer 1848. The remote computer 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wire/wireless connectivity to a local area network (LAN) 1852 and/or larger networks, for example, a wide area network (WAN) 1854. Such LAN and WAN networking environments are commonplace in offices and companies, and facilitate enterprise-wide computer networks, such as intranets, all of which may connect to a global communications network, for example, the Internet.

When used in a LAN networking environment, the computer 1802 is connected to the LAN 1852 through a wire and/or wireless communication network interface or adaptor 1856. The adaptor 1856 can facilitate wire and/or wireless communications to the LAN 1852, which may also include a wireless access point disposed thereon for communicating with the wireless functionality of the adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wire and/or wireless device, connects to the system bus 1808 via the input device interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 19:
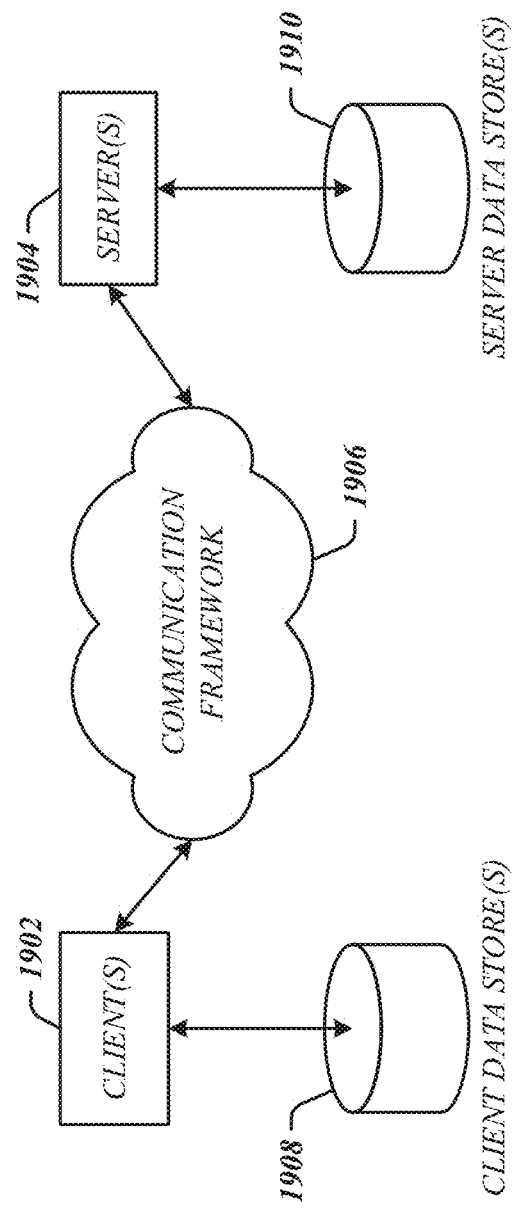
FIG. 19 illustrates an embodiment of a communications architecture.

FIG. 19 illustrates a block diagram of an exemplary architecture 1900 suitable for implementing various embodiments as previously described. The communications architecture 1900 includes various common communications elements, such as a transmitter, receiver, transceiver, radio, network interface, baseband processor, antenna, amplifiers, filters, power supplies, and so forth. The embodiments, however, are not limited to this implementation by the communications architecture 1900.

As shown in FIG. 19, the communications architecture 1900 comprises one or more clients 1902 and servers 1904. The clients 1902 may implement the devices 1420 and 1450. The servers 1904 may implement the server devices 1520 or 1550. The clients 1902 and the servers 1904 are operatively connected to one or more respective client data stores 1908 and server data stores 1910 that can be employed to store information local to the respective clients 1902 and servers 1904, such as cookies and/or associated contextual information.

The clients 1902 and the servers 1904 may communicate information among each other using a communication framework 1906. The communications framework 1906 may implement any well-known communications techniques and protocols. The communications framework 1906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1902 and the servers 1904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 20:
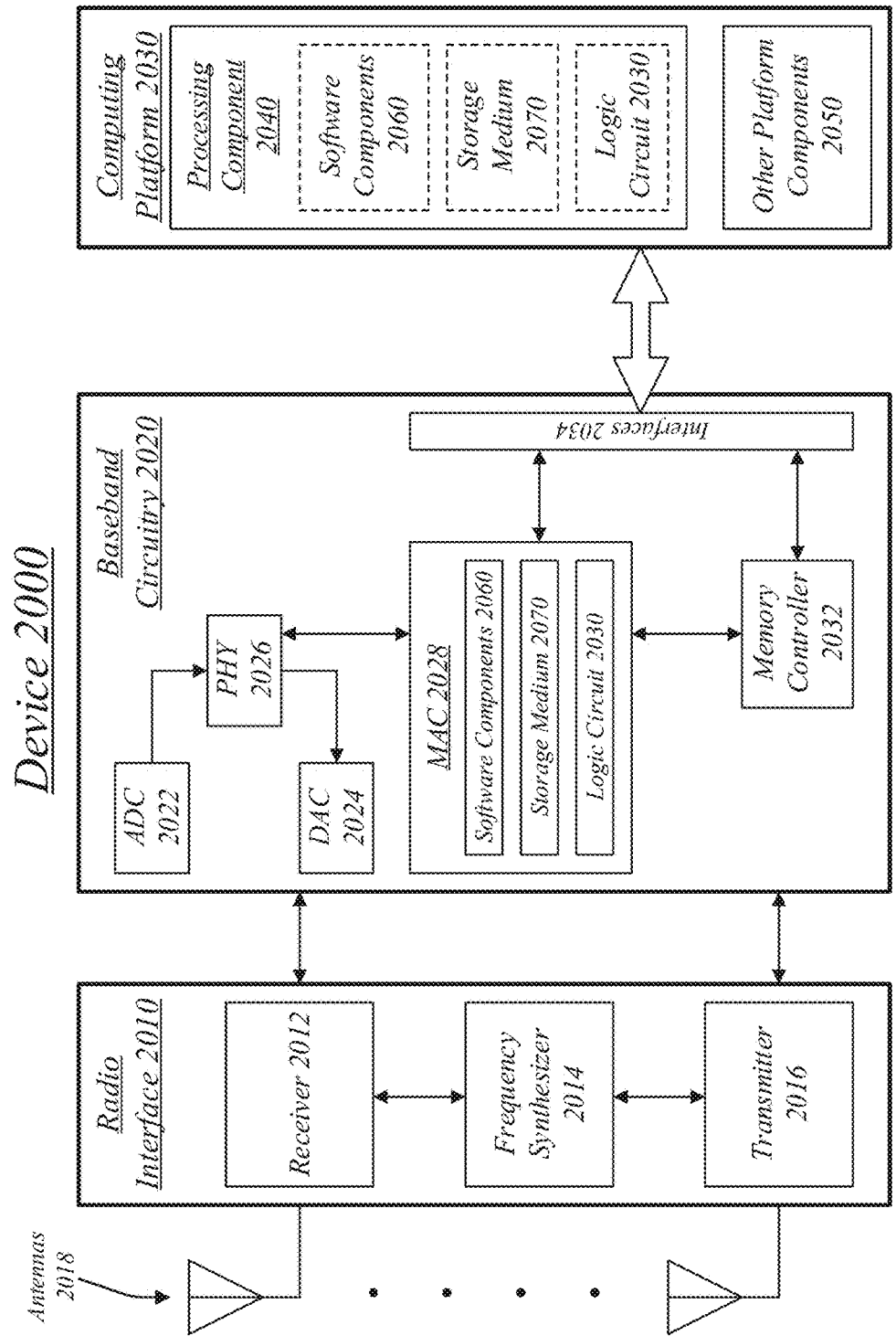
FIG. 20 illustrates an embodiment of a device for use in a multicarrier OFDM system.

FIG. 20 illustrates an embodiment of a device 2000 for use in a multicarrier OFDM system, such as the audio messaging system 100. Device 2000 may implement, for example, software components 2060 as described with reference to messaging web access system 200 and/or a logic circuit 2030. The logic circuit 2030 may include physical circuits to perform operations described for the messaging web access system 200. As shown in FIG. 20, device 2000 may include a radio interface 2010, baseband circuitry 2020, and computing platform 2030, although embodiments are not limited to this configuration.

The device 2000 may implement some or all of the structure and/or operations for the messaging web access system 200 and/or logic circuit 2030 in a single computing entity, such as entirely within a single device. Alternatively, the device 2000 may distribute portions of the structure and/or operations for the messaging web access system 200 and/or logic circuit 2030 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 2010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 2010 may include, for example, a receiver 2012, a transmitter 2016 and/or a frequency synthesizer 2014. Radio interface 2010 may include bias controls, a crystal oscillator and/or one or more antennas 2018. In another embodiment, radio interface 2010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 2020 may communicate with radio interface 2010 to process receive and/or transmit signals and may include, for example, an analog-to-digital converter 2022 for down converting received signals, a digital-to-analog converter 2024 for up converting signals for transmission. Further, baseband circuitry 2020 may include a baseband or physical layer (PHY) processing circuit 2056 for PHY link layer processing of respective receive/transmit signals. Baseband circuitry 2020 may include, for example, a processing circuit 2028 for medium access control (MAC)/data link layer processing. Baseband circuitry 2020 may include a memory controller 2032 for communicating with processing circuit 2028 and/or a computing platform 2030, for example, via one or more interfaces 2034.

In some embodiments, PHY processing circuit 2026 may include a frame construction and/or detection module, in combination with additional circuitry such as a buffer memory, to construct and/or deconstruct communication frames, such as radio frames. Alternatively or in addition, MAC processing circuit 2028 may share processing for certain of these functions or perform these processes independent of PHY processing circuit 2026. In some embodiments, MAC and PHY processing may be integrated into a single circuit.

The computing platform 2030 may provide computing functionality for the device 2000. As shown, the computing platform 2030 may include a processing component 2040. In addition to, or alternatively of, the baseband circuitry 2020, the device 2000 may execute processing operations or logic for the messaging web access system 200 and logic circuit 2030 using the processing component 2040. The processing component 2040 (and/or PHY 2026 and/or MAC 2028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 2030 may further include other platform components 2050. Other platform components 2050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 2000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 2000 described herein, may be included or omitted in various embodiments of device 2000, as suitably desired. In some embodiments, device 2000 may be configured to be compatible with protocols and frequencies associated one or more of the 3GPP LTE Specifications and/or IEEE 2002.16 Standards for WMANs, and/or other broadband wireless networks, cited herein, although the embodiments are not limited in this respect.

Embodiments of device 2000 may be implemented using single input single output (SISO) architectures. However, certain implementations may include multiple antennas (e.g., antennas 2018) for transmission and/or reception using adaptive antenna techniques for beamforming or spatial division multiple access (SDMA) and/or using MIMO communication techniques.

The components and features of device 2000 may be implemented using any combination of discrete circuitry, application specific integrated circuits (ASICs), logic gates and/or single chip architectures. Further, the features of device 2000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 2000 shown in the block diagram of FIG. 20 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Accordingly, embodiments include methods, apparatuses, and computer-readable storage media for communicating using audio messages. For example, a method may include presenting a visual representation associated with an audio file in a user interface view of an application executing on a first mobile device and receiving a control directive to select the visual representation. The method may further include retrieving, from a data store, an indicator of the audio file associated with the selected visual representation; constructing, by the application, a first message comprising a first field to hold an electronic message address for a recipient and a second field to hold the indicator of the audio file associated with the selected visual representation; and sending the first message to the electronic message address of the recipient for delivery to a destination second mobile device.

The electronic message address may be a telephone number of the second mobile device, a network address of the second mobile device, an electronic mail address of the recipient, or a message account identifier. The indicator of the audio file may comprise the audio file or an identifier of the audio file. An identifier of an audio file comprises fewer bits than an audio file.

The application may be a messaging application, a textless messaging application or a social networking application.

The method may include presenting a visual icon as the visual representation of the audio file.

The method may include presenting a plurality of visual representations, each representation associated with a different one of a plurality of audio files. The method may include receiving a plurality of control directives to select a plurality of the visual representations in the user interface view; and constructing the first message comprising a first field to hold an electronic message address for a recipient and a plurality of indicator fields, each indicator field to hold an indicator of an audio file associated with the selected visual representations.

The method may include receiving a second message, at the first mobile device, comprising a second indicator of a second audio file; presenting a playback user interface (UI) element and a second visual representation of the second audio file on the user interface view of the application; receiving a second control directive to select the playback UI element; and outputting the second audio file associated with the second visual representation to an audio output component of the first mobile device. The second indicator may be an identifier of the second audio file, and the method may include requesting the second audio file from a remote storage device using the second identifier; and receiving the second audio file from the remote storage device. The second audio file may be one of a set of a plurality of audio files, and the method may include receiving the set of audio files from the remote storage device in response to the request for the second audio file.

The method may include storing the second indicator of the second audio file, the second audio file, and the second visual representation on a local storage device. The method may include receiving a third message at the first mobile device comprising the indicator of the second audio file; retrieving the second visual representation of the second audio file from the local storage device; presenting the playback UI element and the second visual representation on the user interface view of the application; receiving a third control directive to select the playback UI element; and outputting the second audio file from the local storage to the audio output component.

The method may include receiving a second message at the first mobile device comprising a plurality of indicators of a plurality of audio files; presenting a playback user interface (UI) element and a visual representation of a first of the plurality of audio files associated with the plurality of indicators on the user interface view of the application; receiving a second control directive to select the playback UI element; and outputting the audio files associated with the visual representations sequentially to an audio output component, beginning with the first of the plurality of audio files. The method may include sending the message to the recipient via a peer-to-peer connection between the first mobile device and the second mobile device operated by the recipient.

The method may include sending the message to the recipient via a series of peer-to-peer connections from the first mobile device to a series of one or more intermediary mobile devices ending with a second mobile device operated by the recipient. The method may include polling all mobile devices within a communication range of the first mobile device to identify at least one mobile device enabled for a peer-to-peer connection; and sending the message to an identified peer-to-peer enabled mobile device for forwarding to one of a second peer-to-peer enabled mobile device or to the destination second mobile device. The method may include connecting to a server device when one of the intermediary mobile devices is connected to the server device and delivering the message via the connection to the server device.

The method may include receiving a second control directive to select to preview an audio file; and outputting the audio file to an audio output component of the first mobile device.

The method may include storing an audio file to a storage on the first mobile device; associating the stored audio file with a visual representation; and transmitting the audio file and the associated visual representation to a remote storage. The method may include recording the audio file from a microphone on the first mobile device.

The method may include presenting an address book user interface (UI) in the application; presenting visual representations of contacts in the address book UI; and presenting a visual indicator that a communication path to a contact is available.

The method may include determining that a communication path to the recipient is available.

The method may include presenting an option to purchase a connection to a cellular data network prior to sending the message, when the first mobile device does not have an existing connection to the cellular data network; sending a payment transaction to a messaging server when the option to purchase is selected; and sending the message to the second mobile device via the purchased connection.

An apparatus may include a processor circuit; a transceiver coupled to the processor circuit; a display; a message application component executing on the processor circuit; and a communication component to send a message to a recipient via the transceiver. The message application component may have a user interface (UI) generator to generate user interface views on the display having visual representations of audio files and to receive a control directive activated by selection of a user interface view element, the control directive to select a visual representation of an audio file, a message composer to construct a message to a recipient comprising a first field to hold an electronic message address and a second field to hold an indicator of an audio file associated with the selected visual representation.

The UI generator may present the visual representation of the audio file as a visual icon.

The indicator of the audio file may comprise the audio file or an identifier of the audio file.

The UI generator may present a plurality of visual representations, each visual representation associated with a different one of a plurality of audio files. The UI generator may receive a plurality of control directives each to select one of a plurality of the visual representations; and the message composer may construct a message comprising a first field to hold an electronic message address for the recipient and a plurality of indicator fields, each indicator field to hold an indicator of an audio file associated with the selected visual representations.

The transceiver may receive a second message comprising an indicator of a second audio file; the UI generator may present a playback user interface (UI) element and a second visual representation of the second audio file on the user interface and to receive a second control directive to select the playback UI element. The message application component may comprise a message player to output the second audio file to an audio output component.

When the indicator is an identifier of the second audio file, the message player may request the second audio file from a remote storage device using the second identifier via the transceiver; and receive the second audio file from the remote storage device by the transceiver. When the audio file is one of a set of audio files, the message player may receive the set of audio files from the remote storage using the identifier of the audio file in response to the request for the second audio file.

The apparatus may include a storage component, and the message player may store a second identifier of the second audio file, the second audio file, and the second visual representation on the storage component.

The transceiver may receive a third message comprising the indicator of the second audio file; and the message player may retrieve the second audio file from the local storage in response to receiving the second control directive to select the playback UI element, and output the second audio file from the local storage to the audio output component.

The transceiver may receive a second message comprising a plurality of indicators of a plurality of audio files; the UI generator may present a playback user interface (UI) element and a visual representation of a first of the plurality of audio files associated with the plurality of indicators on the user interface view and receive a second control directive to select the playback UI element; and the message player may output the audio files associated with the visual representations sequentially to an audio output component, beginning with the first of the plurality of audio files.

The transceiver may send the message to the recipient via a peer-to-peer connection between the apparatus and a second mobile device operated by the recipient. The transceiver may send the message to the recipient via a series of peer-to-peer connections from the apparatus to a series of one or more intermediary mobile devices ending with a second mobile device operated by the recipient.

The UI generator may receive a second control directive selecting to preview an audio file; and the message player may output the audio file to an audio output component of the apparatus.

The message application component may include a recorder component to store an audio file to a storage component on the apparatus, and associate the stored audio file with a visual representation. The transceiver may transmit the audio file and the associated visual representation to a remote storage.

The apparatus may include a microphone coupled to the processor circuit; and the recorder component may record the audio file from the microphone.

The UI generator may present an address book user interface (UI); present visual representations of contacts in the address book UI; and present a visual indicator that a communication path to a contact is available.

The transceiver may determine that a communication path to the recipient is available.

The UI generator may present a UI element comprising an option to purchase a connection to a cellular data network prior to sending the message, when the apparatus does not have an existing connection to the cellular data network; and the transceiver may send a payment transaction to a messaging server when the option to purchase is selected to send the message to the second mobile device via the purchased connection.

A computer-readable storage medium may comprise instructions for a for a message application component that, when executed, cause a device to receive a message from a sender comprising an indicator of an audio file; retrieve the audio file and a visual representation associated with the audio file from a data store using the indicator; present a playback user interface (UI) element and the visual representation on a user interface of the message application component; receive a control directive to select the playback UI element; and output the audio file to an audio output component on the device.

When the indicator is an identifier of the audio file, the instructions may cause the device to request the audio file from a remote storage using the identifier; and receive the audio file from the remote storage.

When the audio file is one of a set of a plurality of audio files, the instructions may cause the device to receive the set of the plurality of audio files from the remote storage using the identifier of the audio file.

The instructions may cause the device to store an identifier of the audio file, the audio file, and the visual representation on a local storage. The instructions may cause the device to receive a second message from a sender comprising the indicator of the audio file; wherein the instructions to retrieve the audio file and a visual representation associated with the audio file from a data store using the indicator comprise instructions to retrieve the audio file from the local storage.

The instructions may cause the device to receive a message from a sender comprising a plurality of indicators of a plurality of audio files; present a playback user interface (UI) element and a visual representation of a first of the plurality of audio files associated with the plurality of indicators on the user interface; receive a second control directive to select the playback UI element; and output the audio files associated with the visual representations sequentially to an audio output component, beginning with the first of the plurality of audio files.

The visual representation of the audio file may be a visual icon. The indicator of the audio file comprises the audio file or an identifier of the audio file.

The instructions may cause the device to present a second visual representation associated with a second audio file in the user interface; retrieve, from a data store, an indicator of the audio file associated with the selected visual representation; construct a first message comprising a first field to hold an electronic message address for a recipient and a second field to hold the indicator of the audio file associated with the selected visual representation; and send the first message to the electronic message address of the recipient for delivery to a destination second mobile device.

The instructions may cause the device to present a plurality of visual representations, each representation associated with a different one of a plurality of audio files.

The instructions may cause the device to receive a plurality of control directives each to select one of a plurality of the visual representations in the user interface; and construct the first message comprising a first field to hold an electronic message address for a recipient and a plurality of indicator fields, each indicator field to hold an indicator of an audio file associated with the selected visual representations.

The instructions may cause the device to send the message to the recipient via a peer-to-peer connection between the device and the second mobile device operated by the recipient.

The instructions may cause the device to send the message to the recipient via a series of peer-to-peer connections from the device to a series of one or more intermediary mobile devices ending with a second mobile device operated by the recipient.

The instructions may cause the device to connect to a server device when one of the intermediary mobile devices is connected to the server device and delivering the message via the connection to the server device.

The instructions may cause the device to receive a third control directive to select to preview an audio file; and output the audio file to an audio output component of the device.

The instructions may cause the device to present an address book user interface (UI) in the application; present visual representations of contacts in the address book UI; and present a visual indicator that a communication path to a contact is available.

The instructions may cause the device to determine that a communication path to the recipient is available.

The instructions may cause the device to present an option to purchase a connection to a cellular data network prior to sending the message, when the first mobile device does not have an existing connection to the cellular data network; send a payment transaction to a messaging server when the option to purchase is selected; and send the message to the second mobile device via the purchased connection.

The instructions may cause the device to store an audio file to a storage unit on the device; associate the stored audio file with a visual representation; and transmit the audio file and the associated representation to a remote storage. The instructions may cause the device to record the audio file from a microphone on the device.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   presenting a visual representation associated with an audio file in a user interface view of an application executing on a first mobile device;
   receiving a control directive to select the visual representation;
   retrieving, from a data store on the first mobile device or from a remote data store of a messaging server, an indicator of the audio file associated with the selected visual representation;
   constructing, by the application, a first message comprising a first field to hold an electronic message address for a recipient and a second field to hold the indicator of the audio file associated with the selected visual representation;
   determining when the first mobile device does not have an existing connection to the cellular data network;
   presenting a first option to purchase a connection to a cellular data network prior to sending the first message and second option to purchase one or more visual representations for association with audio files;
   sending a payment transaction to a payment component of the messaging server in response to selecting one of the first and second options to purchase; and
   sending the first message to the second mobile device via the purchased connection in response to the first option to purchase the connection to the cellular data network being selected.

2. The method of claim 1, wherein the indicator of the audio file comprises the audio file or an identifier of the audio file.

3. The method of claim 1, comprising:
   receiving a second message, at the first mobile device, comprising a second indicator of a second audio file;
   presenting a playback user interface (UI) element and a second visual representation of the second audio file on the user interface view of the application;
   receiving a second control directive to select the playback UI element; and
   outputting the second audio file associated with the second visual representation to an audio output component of the first mobile device.

4. The method of claim 3, wherein the second indicator is an identifier of the second audio file, the method comprising:
   requesting the second audio file from a remote storage device using the second identifier; and
   receiving the second audio file from the remote storage device.

5. The method of claim 1, comprising:
   storing an audio file to a storage on the first mobile device;
   associating the stored audio file with a visual representation; and
   transmitting the audio file and the associated visual representation to a remote storage.

6. The method of claim 1, comprising:
   sending the message to the recipient via a peer-to-peer connection between the first mobile device and the second mobile device operated by the recipient.

7. An apparatus, comprising:
   a processor circuit;
   a message application component for execution on the processor circuit, the message application component comprising:
      a user interface (UI) generator to generate user interface views on the display having visual representations of audio files and to receive a control directive activated by selection of a user interface view element, the control directive to select a visual representation of an audio file, and
      a message composer to construct a message to a recipient comprising a first field to hold an electronic message address and a second field to hold an indicator of an audio file associated with the selected visual representation, the indicator being retrieved from a data store on the first mobile device or from a remote data store of a messaging server; and
   a transceiver component communicatively coupled to the processor circuit;
   wherein the UI generator performs the further functions of:
      determining when the first mobile device does not have an existing connection to the cellular data network;
      presenting a first option to purchase a connection to a cellular data network prior to sending the message and second option to purchase one or more visual representations for association with audio files;
      sending a payment transaction to a payment component of the messaging server when the first or second option to purchase is selected; and
   wherein the transceiver component sends the message via the purchased connection in response to the first option to purchase the connection to the cellular data network being selected.

8. The apparatus of claim 7, the transceiver to receive a second message comprising an indicator of a second audio file;
   the UI generator further to present a playback UI element and a second visual representation of the second audio file on the user interface and to receive a second control directive to select the playback UI element; and
   the message application component comprising a message player to output the second audio file to an audio output component.

9. The apparatus of claim 8, wherein the indicator is an identifier of the second audio file, the message player further to:
   request the second audio file from a remote storage device using the second identifier via the transceiver; and
   receive the second audio file from the remote storage device by the transceiver.

10. The apparatus of claim 9, comprising a storage component, the message player further to store an identifier of the second audio file, the second audio file, and the second visual representation on the storage component.

11. The apparatus of claim 7, the transceiver further to send the message to the recipient via a series of peer-to-peer connections from the apparatus to a series of one or more intermediary mobile devices ending with a second mobile device operated by the recipient.

12. The apparatus of claim 7, the UI generator further to receive a second control directive selecting to preview an audio file; and the message player further to output the audio file to an audio output component of the apparatus.

13. The apparatus of claim 8, the transceiver further to determine that a communication path to the recipient is available.

14. A non-transitory computer readable medium, comprising instructions for a message application component that, when executed, cause a device to:
   present a visual representation associated with an audio file in a user interface view of an application executing on a first mobile device;
   receive a control directive to select the visual representation;
   retrieve, from a data store on the first mobile device or from a remote data store of a messaging server, an indicator of the audio file associated with the selected visual representation;
   construct, by the application, a first message comprising a first field to hold an electronic message address for a recipient and a second field to hold the indicator of the audio file associated with the selected visual representation;
   determine when the first mobile device does not have an existing connection to the cellular data network;
   present a first option to purchase a connection to a cellular data network prior to sending the first message and second option to purchase one or more visual representations for association with audio files;
   send a payment transaction to a payment component of the messaging server in response to selecting one of the first and second options to purchase; and
   send the first message to the second mobile device via the purchased connection in response to the first option to purchase the connection to the cellular data network being selected.

15. The non-transitory computer readable medium of claim 14, wherein the indicator of the audio file comprises the audio file or an identifier of the audio file.

16. The non-transitory computer readable medium of claim 14, comprising further instructions that, when executed, cause the device to:
   receive a second message, at the first mobile device, comprising a second indicator of a second audio file;
   present a playback user interface (UI) element and a second visual representation of the second audio file on the user interface view of the application;
   receive a second control directive to select the playback UI element; and
   output the second audio file associated with the second visual representation to an audio output component of the first mobile device.

17. The non-transitory computer readable medium of claim 16, wherein the second indicator is an identifier of the second audio file, comprising further instructions that, when executed, cause the device to:
   request the second audio file from a remote storage device using the second identifier; and
   receive the second audio file from the remote storage device.

18. The non-transitory computer readable medium of claim 14, comprising further instructions that, when executed, cause the device to:
   store an audio file to a storage on the first mobile device;
   associate the stored audio file with a visual representation; and
   transmit the audio file and the associated visual representation to a remote storage.

19. The non-transitory computer readable medium of claim 14, comprising further instructions that, when executed, cause the device to:
   send the message to the recipient via a peer-to-peer connection between the first mobile device and the second mobile device operated by the recipient.

* * * * *